Sept. 17, 1940.  A. VISCHER, JR  2,214,913
PHONOGRAPH
Filed Feb. 17, 1936  11 Sheets-Sheet 1

Inventor:
Alfred Vischer Jr.
By Williams, Bradbury, McCaleb & Hinkle,
Attys.

Sept. 17, 1940.  A. VISCHER, JR  2,214,913
PHONOGRAPH
Filed Feb. 17, 1936  11 Sheets-Sheet 2
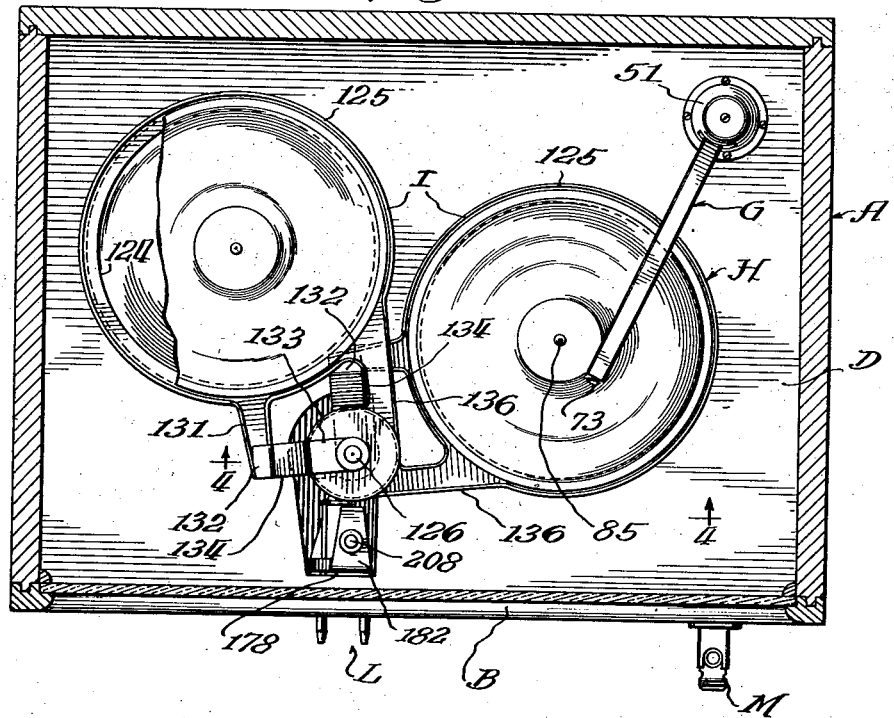
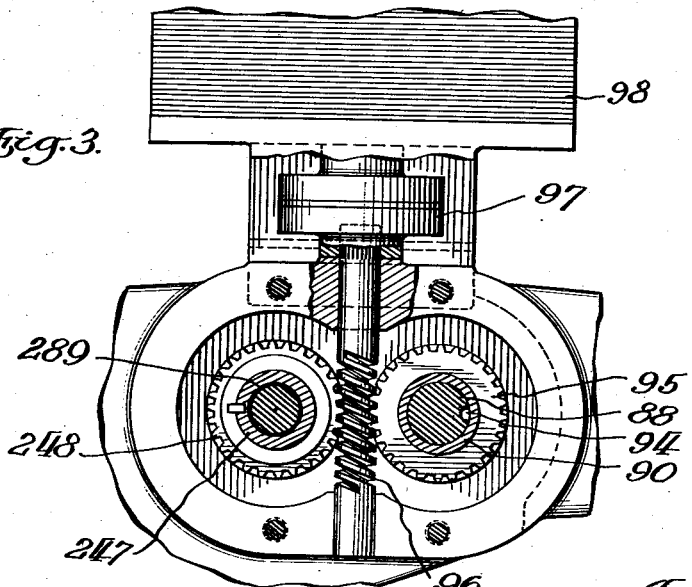
Inventor:
Alfred Vischer Jr
By Williams, Bradbury, McCaleb & Hinkle
Attys.

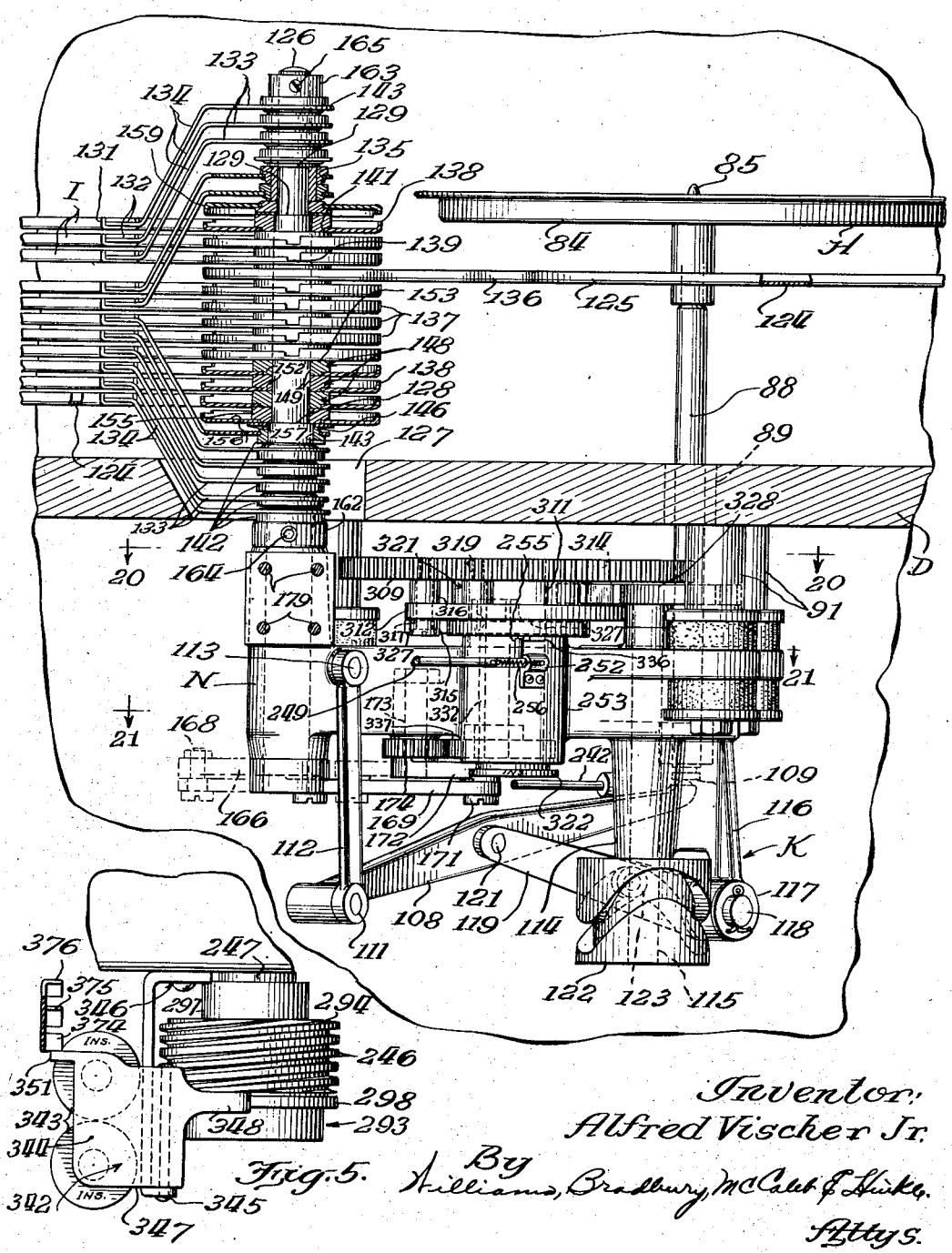

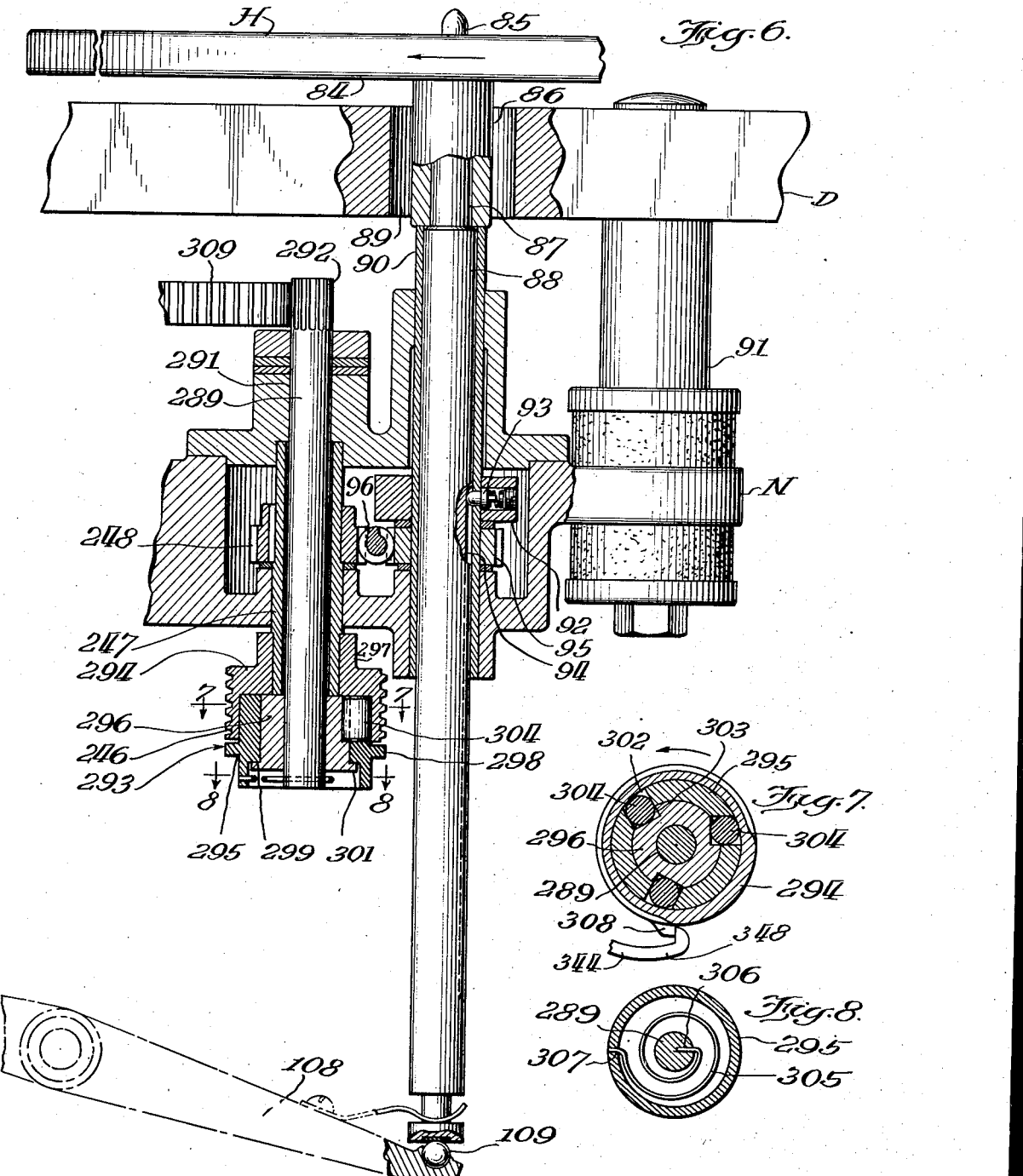

Sept. 17, 1940.  A. VISCHER, JR  2,214,913
PHONOGRAPH
Filed Feb. 17, 1936  11 Sheets-Sheet 5
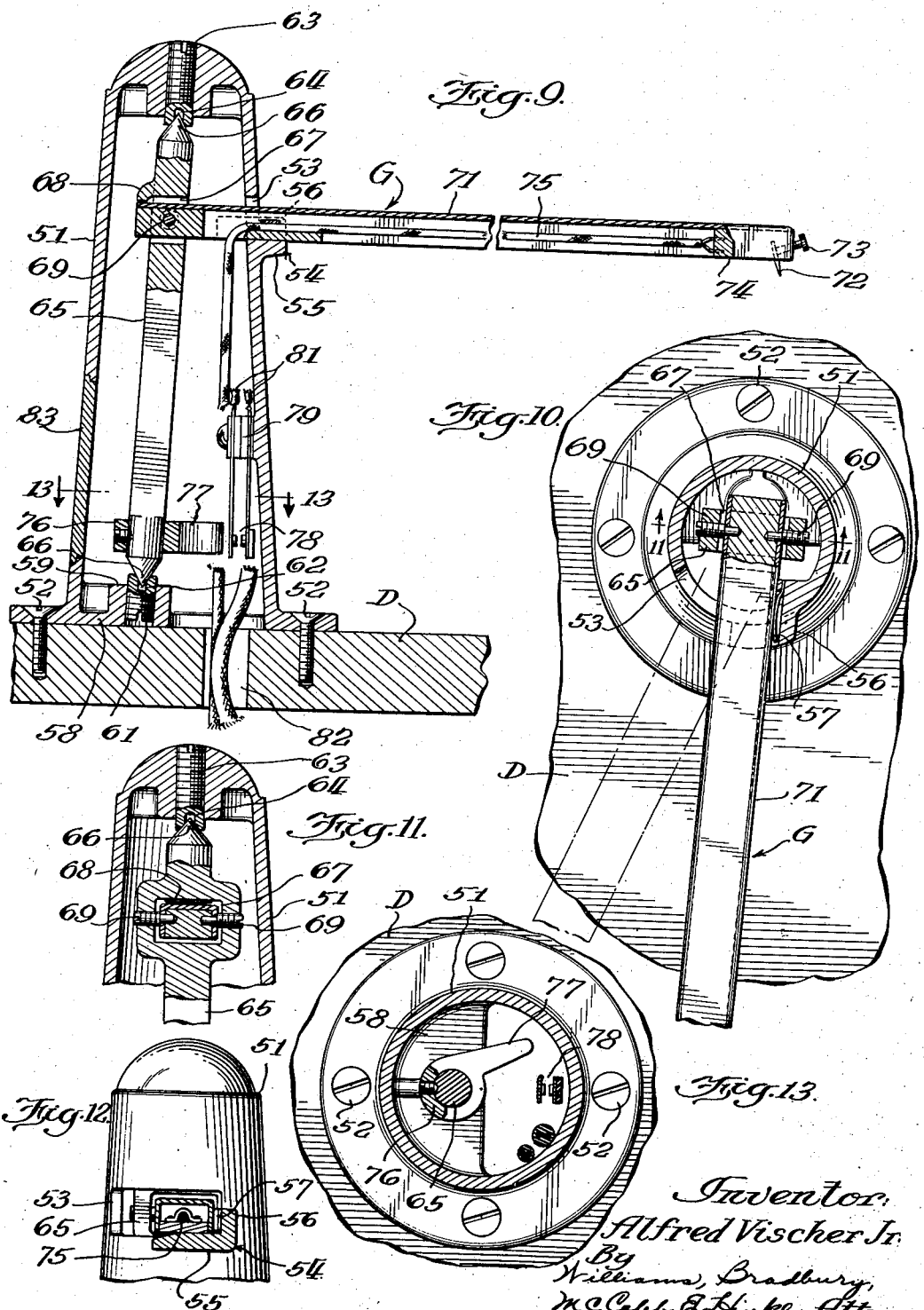

Sept. 17, 1940.  A. VISCHER, JR  2,214,913
PHONOGRAPH
Filed Feb. 17, 1936  11 Sheets-Sheet 6

Inventor
Alfred Vischer Jr.
By Williams, Bradbury,
McCaleb & Hinkle Attys.

Sept. 17, 1940.  A. VISCHER, JR  2,214,913
PHONOGRAPH
Filed Feb. 17, 1936  11 Sheets-Sheet 7
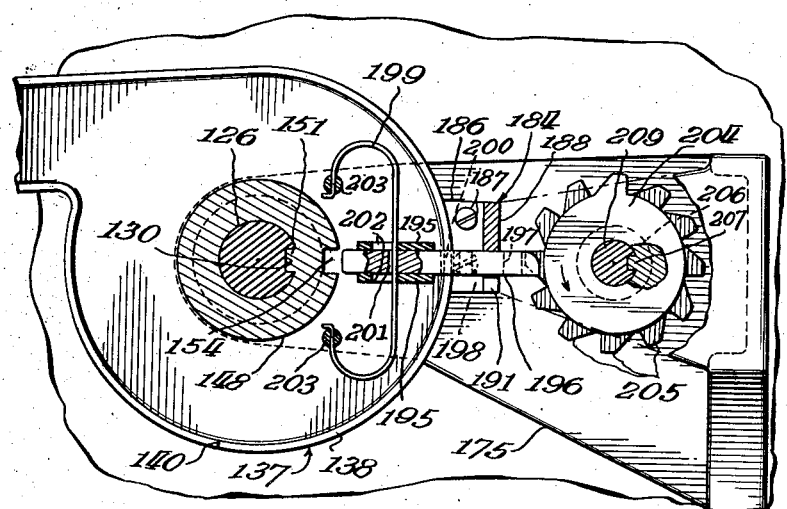
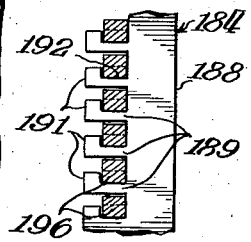
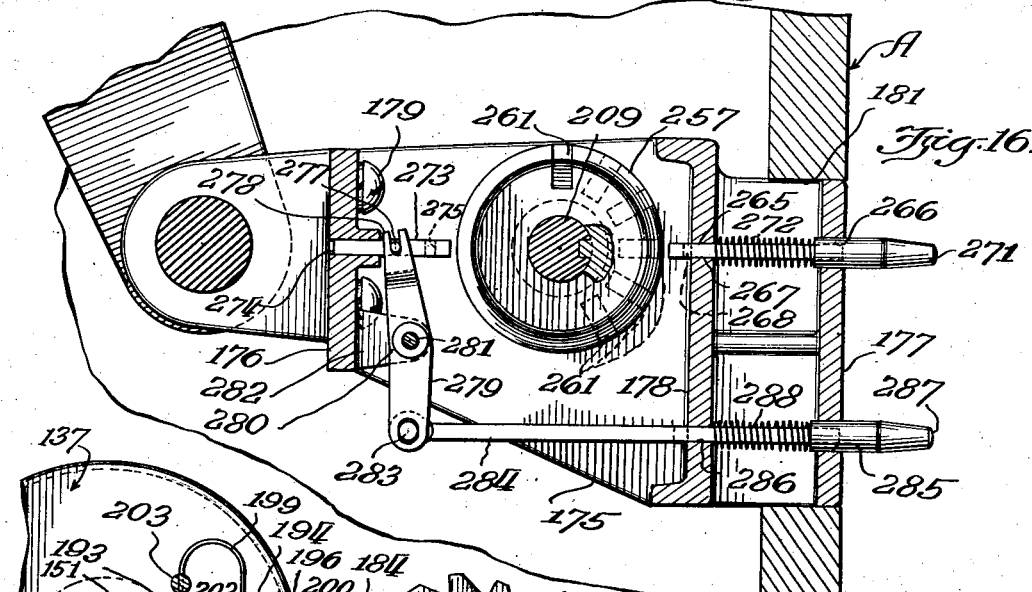
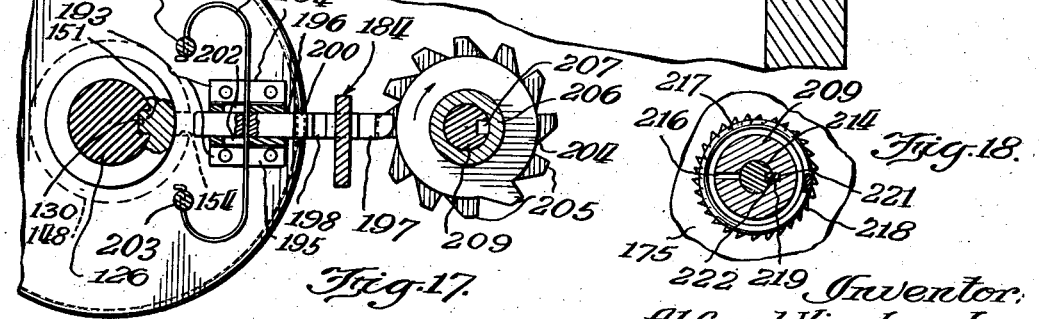
Inventor:
Alfred Vischer Jr.
By Williams, Bradbury, McCaleb & Hinkle
Attys.

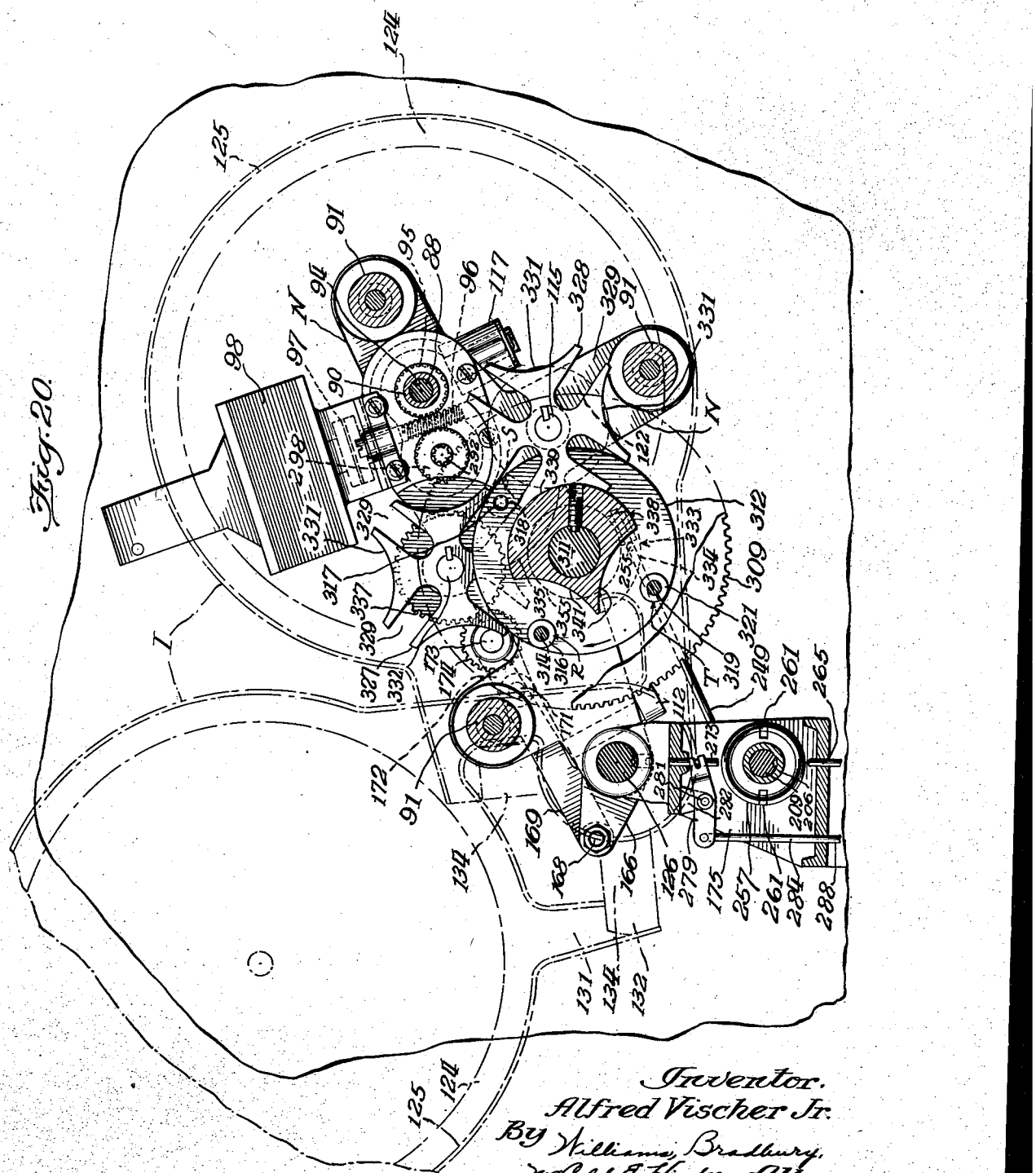

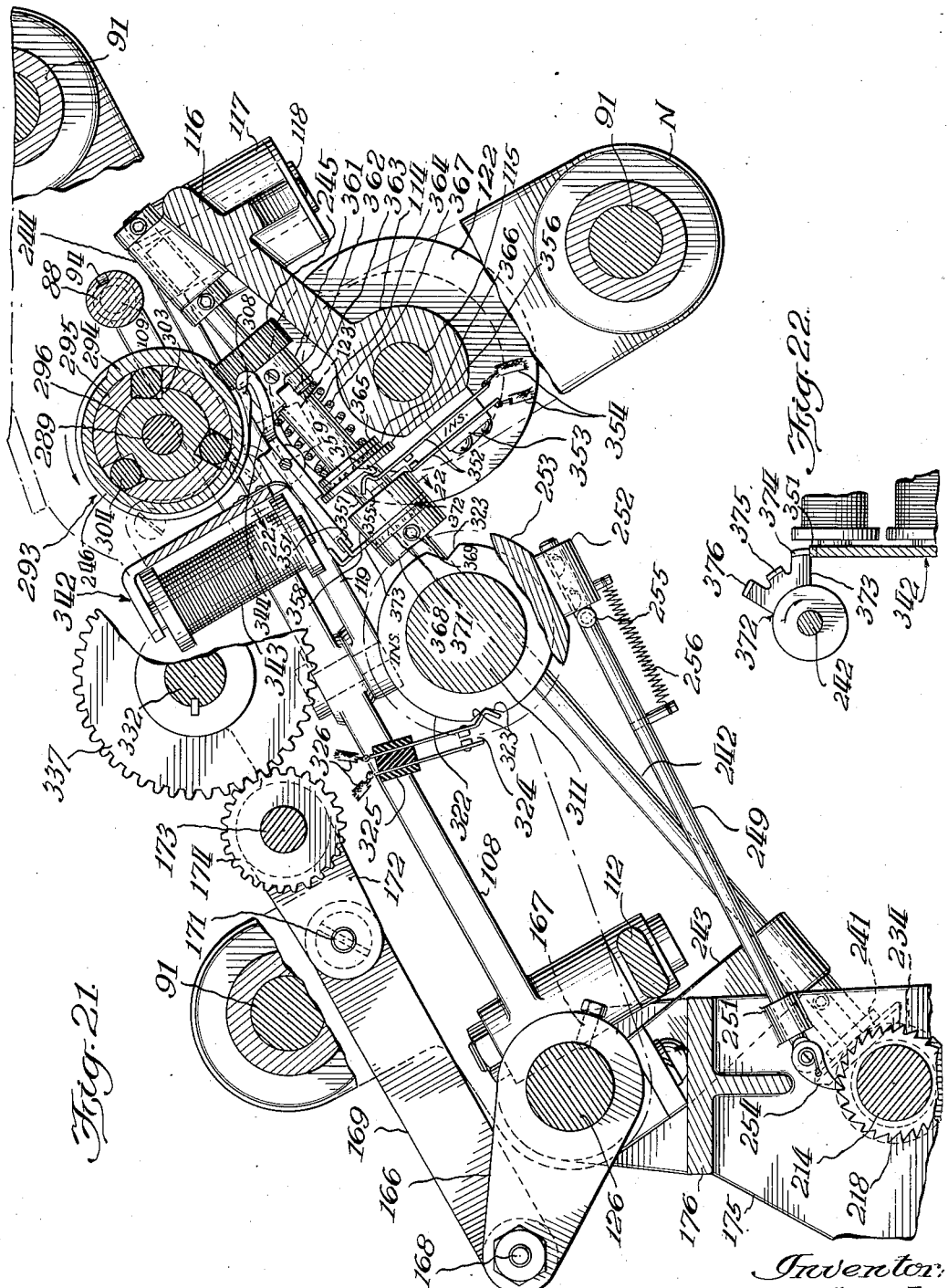

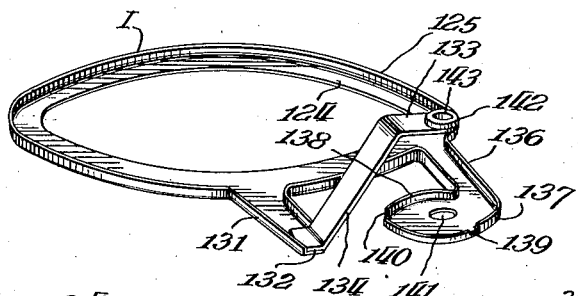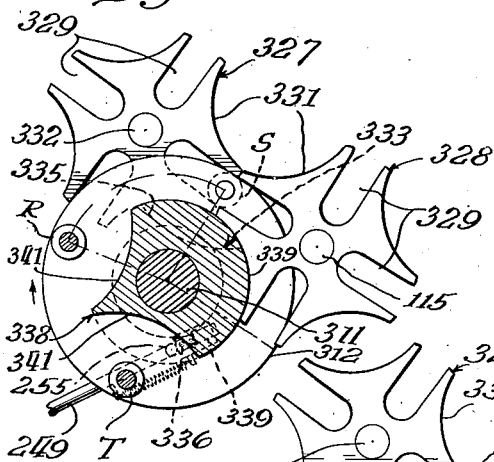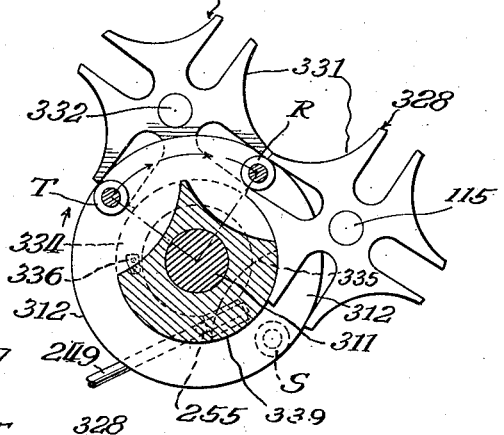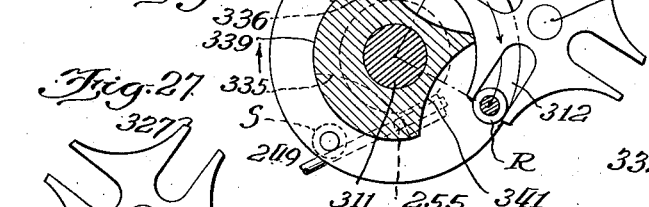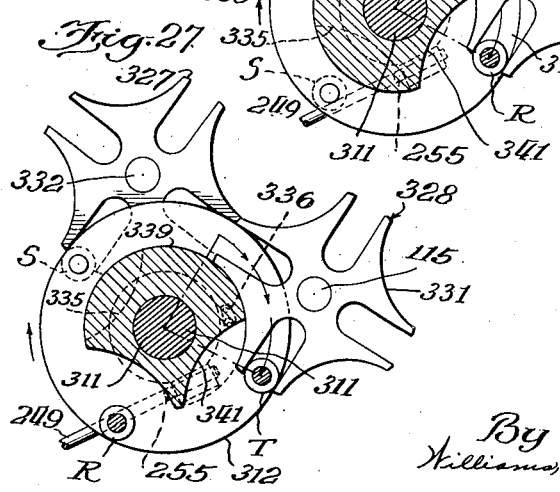

Sept. 17, 1940.  A. VISCHER, JR  2,214,913
PHONOGRAPH
Filed Feb. 17, 1936   11 Sheets-Sheet 11
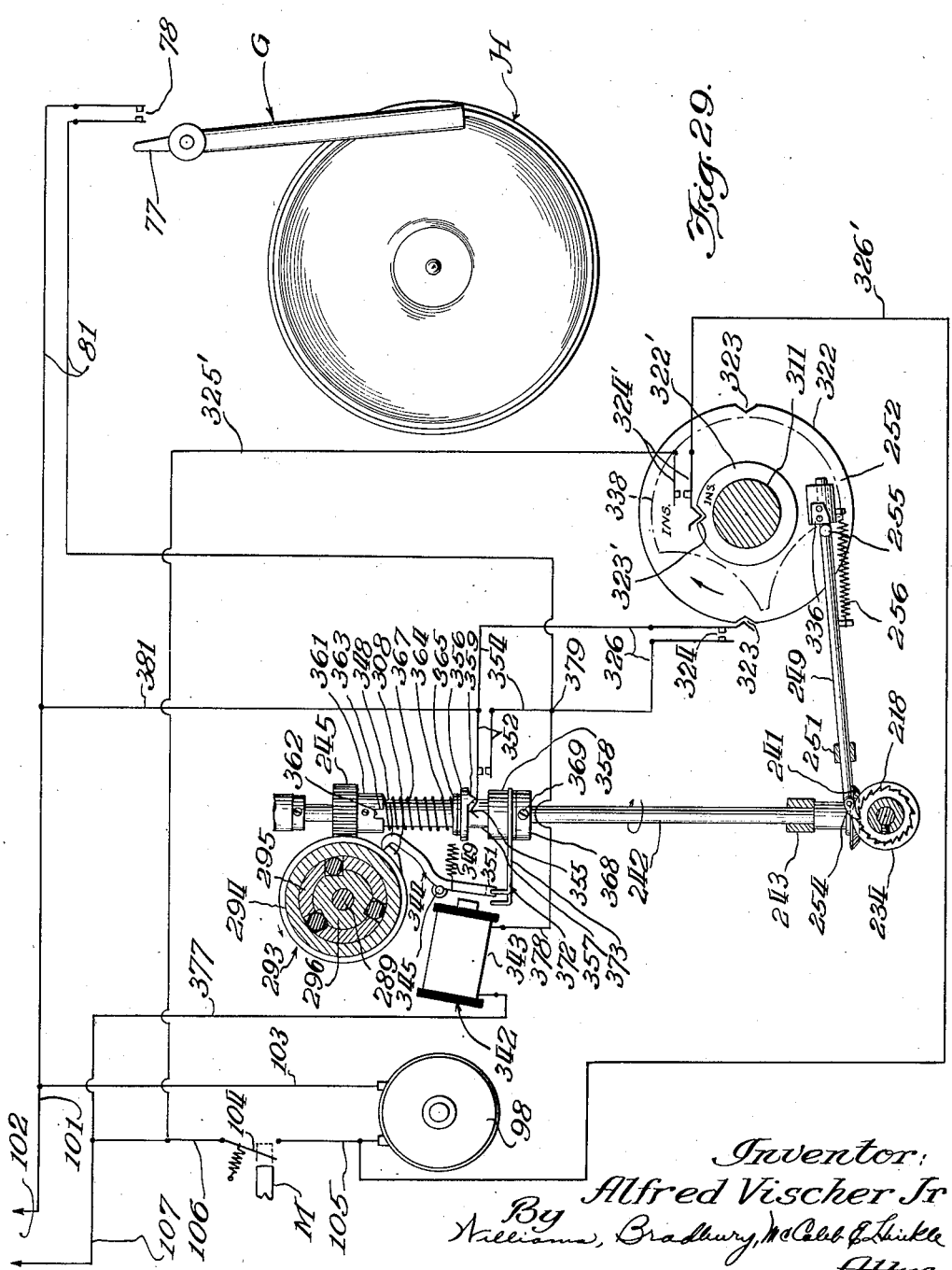

Patented Sept. 17, 1940

2,214,913

UNITED STATES PATENT OFFICE 2,214,913

PHONOGRAPH

Alfred Vischer, Jr., Park Ridge, Ill., assignor to Rock-Ola Manufacturing Corporation, Chicago, Ill., a corporation of Delaware Application February 17, 1936, Serial No. 64,234

9 Claims. (Cl. 274—10)

This invention relates, in general, to sound reproducing apparatus, and has more particular reference to phonographs.

An important object of the invention is the provision of a novel and an improved phonograph.

Another important object of the invention is the provision of a multi-record phonograph for playing records selectively or in seriatim.

A further important object of the invention is to provide intermittent driving and timing means for such phonographs, which operates, and co-ordinates the operation of, a movable turntable and a movable record carrier and which may be driven from the motor used for rotating the turntable.

A primary object of the invention is to provide such driving and timing means not only for operating any one of a plurality of record carriers in timed relation with a turntable movable to and from a playing position, but also for positively locking the record carriers and the turntable in their various positions corresponding to playing and non-playing periods, respectively.

An additional important object of the invention is to provide in such a phonograph, simplified driving and timing means, a selector, and selector control means, which cooperate for automatically effecting the selection called for by the selector control means whereby the record carrier bearing the selected record is operated to deliver the selected record to the turntable for playing.

An important object of the invention is to provide in such a phonograph, turntable reciprocating apparatus which rigidly supports the turntable in its playing position, and which is readily operable to move it to and from such position.

Another important object of the invention is to provide in such a phonograph, a reproducer which automatically returns to a record starting position when the reciprocable turntable removes the played record from engagement with the reproducer.

A further important object of the invention is the provision of driving and timing apparatus operable by the same motor, which rotates the turntable for driving the record carrier swinging apparatus and the turntable reciprocating apparatus in timed relationship.

Another important object of the invention is so to support the record carriers as to minimize the sagging thereof.

Other important objects of the invention will become apparent from the following description, which, taken in connection with the accompanying drawings, illustrate an embodiment of the invention.

In the drawings:

Fig. 2 is a transverse cross section through the cabinet substantially along the lines 2—2 of Fig. 1, and shows a plan view of the phonograph apparatus with a record carrier in its delivery position;

Fig. 3 is a fragmentary view, partially in cross section and partially in plan, showing the main drive of the phonograph;

Fig. 4 is a fragmentary cross section taken substantially along the lines 4—4 of Fig. 2;

Fig. 5 is a fragmentary elevation of a clutch and control therefor employed for coupling and uncoupling the driving motor to and from the novel driving and timing apparatus;

Fig. 6 is an elevational view partially in cross section showing another view of the main drive of Fig. 3 and its relationship to the turntable and the clutch shown in the preceding figure;

Fig. 7 is a cross sectional detail taken substantially along the lines 7—7 of Fig. 6;

Fig. 8 is a cross sectional detail taken substantially along the line 8—8 of Fig. 6;

Fig. 9 is an elevational view partially in cross section showing the reproducer and its mounting for causing its automatic return to starting position;

Fig. 10 is a plan view partially in cross section showing another view of the apparatus shown in Fig. 9;

Fig. 11 is a fragmentary cross section through the reproducer of Fig. 9 and is taken substantially along the lines 11—11 of Fig. 10;

Fig. 12 is a fragmentary elevation of the reproducer mounting of Fig. 9 with the reproducer arm shown in cross section and at a starting position;

Fig. 13 is a cross section taken substantially along the lines 13—13 of Fig. 9, with portions broken away to bring out certain details of construction;

Fig. 15 is a fragmentary cross section taken substantially along the lines 15—15 of Fig. 14;

Fig. 16 is a fragmentary cross section taken substantially along the lines 16—16 of Fig. 14;

Fig. 17 is a fragmentary cross section taken substantially along the lines 17—17 of Fig. 14;

Fig. 18 is a cross sectional detail taken substantially along the lines 18—18 of Fig. 14;

Fig. 19 is a cross sectional detail taken substantially along the lines 19—19 of Fig. 14;

Fig. 20 is a fragmentary cross section taken substantially along the lines 20—20 of Fig. 4 with parts broken away and parts shown in phantom lines to show the operation of the driving and timing mechanisms and their relationship to the driven mechanisms of the phonograph;

Fig. 21 is a fragmentary cross section taken substantially along the lines 21—21 of Fig. 4, but on a different scale;

Fig. 22 is a cross sectional detail of a control device and is taken substantially along the lines 22—22 of Fig. 21;

Fig. 23 is a perspective view of one of the novel record carriers;

Figs. 24 to 28, inclusive, are detailed cross sections through the driving and timing means, and illustrate the various operative positions thereof; and Fig. 29 is a diagrammatic view of the wiring diagram illustrative of the operation of the novel phonograph.

Illustrative of the invention, the novel phonograph is shown as being of the multi-record type and is provided with a casing or cabinet A of any usual design and construction. A suitable design and construction for the cabinet A is illustrated in Figs. 1 and 2, and is provided with a sight window B in its front side, a sound escape opening or grill C in the front side below the sight window B, and a mounting panel D, commonly referred to as the motor board, fixed inside the cabinet A near the sight window B.

Figure 1:
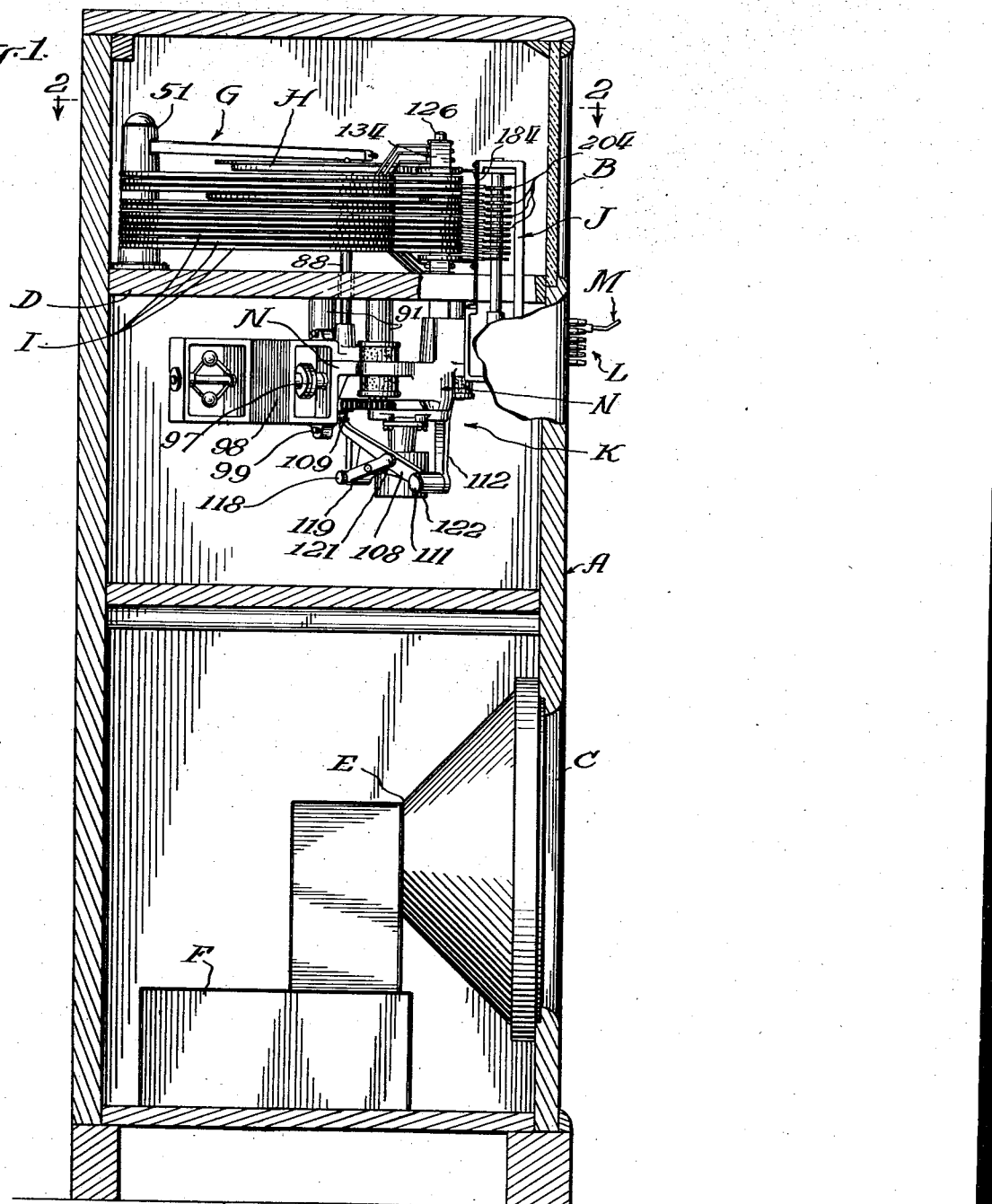
Fig. 1 is a side elevation of a phonograph assembled in a cabinet or casing shown partly in cross section, which embodies some of the features of the invention.

That cabinet A is adapted to carry therein the phonograph apparatus which is partially visible through the sight window B as shown in Fig. 1. Thus, the cabinet A encases a usual sound converter or loud speaker E adjacent the sound escape opening C, and a suitable amplifier F. It will be understood that the speaker E is electrically connected to the amplifier F which in turn is electrically connected to the reproducer whereby electrical impulses caused by and correlated with the actuations of the reproducer from the record being played are, after amplification by the amplifier F, converted into sound by the loud speaker E.

Generally speaking the illustrated phonograph comprises, in addition to the loud speaker and amplifier, a reproducer G, frequently referred to as a record playing or tone arm, a turntable H movable to and from playing relation with respect to the reproducer G, a plurality of movable record carriers I each adapted to carry a phonograph record for reproduction by the reproducer G, a selector J for selecting any one of the record carriers I to select the record to be played, driving and timing means K for positioning the selector J in any of its selecting positions in response to a selector control L and for driving and coordinating the movements of the record carriers I and the turntable H whereby any selected record is movable to and from playing engagement with the reproducer G, and, if desired, a token or coin released device M for controlling the operation of the phonograph.

Briefly, by operating the selector control L and inserting a token or coin in the device M, a desired record may be selected whereupon the driving and timing means K will position the selector J in accordance with the operation of the selector control L; will move the record carrier bearing the selected record to a delivery position; and will, while the selected record is held in that delivery position, move the turntable H toward the reproducer G. In moving toward the reproducer the turntable passes through that delivery position to remove the selected record therefrom and to cooperate with the reproducer in playing the selected record. While the record is thus being played, the reproducer G under the influence of the sound track moves toward the center of the record on the turntable H, and conditions or positions itself so that when it is released by or disengaged from the sound track, it will automatically return to its starting position.

When the selected record has thus been played, the driving and timing means K will move the turntable bearing the played record away from the reproducer G, which thus being released automatically returns to its starting position; will return the record to its record carrier which has remained at the delivery position during the playing of the record; and will return the record carrier bearing the played record from the delivery position to its original position. The cycle of operations as just described may be repeated as many times as desired.

The reproducer

As best shown in Figs. 1, 2, and 9 to 13, inclusive, the reproducer G comprises a hollow, upstanding bearing post or column 51 mounted as by screws 52 on the mounting panel D between the rear wall of the cabinet A and the turntable H and having an aperture 53 at the upper end of the post in the side thereof facing the turntable, and an angular lug 54 with a horizontal arm 55 under the aperture 53 and with an arm 56 at an end of the aperture 53, and projecting forwardly of the post 51 along a line which, if extended, would pass near the starting edge of a record on the turntable. The face of the lug 54 adjacent the aperture 53 is provided with a resilient member or spring 57 for a purpose to be described more fully presently.

The post 51 has its lower end partially closed by a base ledge portion 58 provided with a hub portion 59 rearwardly adjacent the vertical axis of the post. That hub portion 59 has journaled therein a bearing member 61 which, as shown in Fig. 9, may be threaded into the hub member and which at its inner end is provided with a bearing depression or recess 62. Associated with the bearing member 61 is a similar member 63 threadably receivable in the upper end of the post 51 and having a bearing depression or recess 64 in its inner end. The bearing depressions 62 and 64 are so arranged that they are coaxial and their common axial line is, from the lower bearing depression 62 to the upper bearing depression 64, inclined upwardly and in a lateral direction away from the record carriers I.

Those bearing members 61 and 63 are adapted to carry a rotatable playing arm support member 65 which has its ends pointed as at 66 to cooperate with the bearing depressions 62 and 64 for rotatably supporting the support member 65. That support member is thus mounted so that from its lower end to its upper end it is laterally inclined and has intermediate its ends at the level of the aperture 53, a socket or aperture 67 and a laterally extending and depending lug 68 which cooperates with pivot screws or other suitable pivoting means 69 for pivotally securing an arm 71 in the socket or aperture 67 for limited rotation about a horizontal axis.

That arm 71 extends rearwardly of the pivoting means 69 sufficiently to be engaged by the lug 68 for limiting rotation of the arm 71 in a clockwise direction as viewed in Fig. 9, and extends forwardly through the aperture 53 to a position overhanging the turntable H. At its forward end the arm 71 is provided with a needle or stylus 72 removably held therein as at 73 and means, diagrammatically shown at 74 in Fig. 9, for converting mechanical vibrations or other movements of the needle 72 into correlated electrical impulses which may be transmitted to the amplifier F by electrical conducting means 75.

Fixed at the lower end of the support member 65 to rotate therewith is a collar 76 having a laterally projecting finger or lug 77 for operating normally open, resilient electrical contact members 78, suitably mounted as at 79 inside of the post 51, when the needle 72 reaches a position over the turntable corresponding to the end of a record thereon. The purpose of the contacts 78 is to cause the driving and timing means K to resume operation at the end of each played record and for that purpose the contact members 78 are electrically connected by conductors 81 to the control circuit as shown in Fig. 29. The conductors 75 and 81 extend from the reproducer through an aperture 82 in the panel D to the amplifier F and the control circuit, respectively. An operable door or window 83 may be provided in a side wall of the post 51 to facilitate assembling and servicing the parts in the post.

By virtue of the inclination of the pivoted support member 65, gravity tends to urge the arm 71 toward a natural position of rest beyond, and at the side of the lug 54 opposite the record carriers I. In its normal non-playing position, the arm 71 rests on the horizontal arm 55 against the spring 57 which is compressed by the arm 71. The friction between the arm 71 and the supporting arm 55 is sufficient to hold the arm 71 in that position against the action of the compressed spring 57 until the arm 71 is swung upwardly about its pivot 69.

It will be seen that, due to the inclination of the support member 65, if the arm 71 is swung toward the record carriers I, that arm would be gradually raised as it moved away from its position on the lug 54. When the turntable H presents a record for playing, the record moving with the turntable engages the needle 72 and moves the arm 71 upwardly about the pivot 69 to the level which the arm would assume if it were swung, as just described, toward the record carriers I, thus relieving the friction between the arms 55 and 71. When that friction is thus relieved, the spring 57 moves the arm 71 toward the center of the record engaged by the needle 72, causing the needle to engage in the starting groove of the record to be played.

As the record is played, the needle 72 following the sound track or groove therein causes the arm 71 to swing toward the center of the record, thus swinging the arm 71 and its supporting member 65 about the laterally inclined, longitudinal axis of the member 65 in a direction to move the arm 71 against the force of gravity away from the spring 57. As the needle 72 completes the record the finger 77 rotating with the pivoted member 65 closes the contacts 78 which cause the turntable H bearing the played record to be moved away from the playing position. That movement of the turntable causes the record to disengage the needle 72 thus freeing the arm 71 which swings by gravity toward its natural position of rest. The spring 57 yieldingly stops that return movement of the arm 71 and remains compressed for urging the arm toward the starting position of a subsequent record, as described above.

The turntable

The turntable H cooperates with the reproducer G to play records and comprises a disc or other suitably shaped plate-like member 84 for supporting a record and for rotating the same for playing. As shown in Fig. 6, that disc 84 is provided on its upper face with a center pin 85 to facilitate centering a record thereon and, on its opposite face, with a depending hub or socket 86 which is fixed on to rotate with a reduced portion 87 at the upper end of a shaft 88. That shaft 88 passes through an aperture 89 in the panel D and is slidably arranged in a sleeve 90 which is rotatably journaled in a frame or chassis N suspended as at 91 from the mounting panel D. Intermediate the ends of the sleeve 90 a collar 92 embraces the sleeve and carries a spring urged pin or key 93 extending through the sleeve and into a keyway 94 in and longitudinally of the shaft 88.

In that manner the shaft 88 is yieldably keyed to, for rotation with the sleeve 90, and is reciprocable longitudinally thereof. For rotating the sleeve and the shaft, the sleeve has fixed thereon in the region of the collar 92 a worm wheel 95 in engagement with a worm gear 96 which is suitably coupled as at 97 in driving relationship with an electrical motor 98 or other usual driving means as shown in Figs. 1, 3, and 20. That motor 98 is secured as shown at 99 in Fig. 1, to the frame N and is electrically connected as shown in Fig. 29 to one side 101 of a source 102 of electrical energy by a conductor 103 and to a control switch 104, by a conductor 105. The other terminal of the control switch 104 is connected by a conductor 106 to another side 107 of the source 102. Preferably, the switch 104 is operable by the coin released mechanism M.

The turntable, it will be remembered, is movable to and from playing position with respect to the reproducer G. To move the turntable in that manner I provide a cam driven linkage which is controlled by the driving and timing means K and which rigidly supports the turntable in its playing position whereby to avoid or to minimize vibration of the turntable during the playing of the record, and consequently unfaithful reproduction caused by the effects of such vibration on the needle 72.

Such a cam driven linkage is illustrated in Figs. 1, 4, and 6 as comprising an arm 108 which at one end is coupled, preferably by a ball and socket coupling 109, to the lower end of the reciprocable turntable shaft 88 and which at its opposite end is pivotally connected as at 111 to the lower end of an arm 112 having its upper end pivotally supported as at 113 on the frame N. Forwardly of the turntable shaft 88, the frame N is provided with a depending arm or bracket 114 (see Figs. 4 and 21) which is formed to journal at one side thereof a rotatable shaft 115 of the driving and timing means K and which has a fin or flange portion 116 extending laterally from the shaft journal to the region of the ball and socket coupling 109. The lower end of that portion 116 is formed with a horizontal hub portion 117 which carries a pivot pin 118 for an arm 119 pivoted thereon and having its opposite end pivoted as at 121 to the arm 108 intermediate its ends. The rotatable shaft 115 of the driving and timing means K has fixed thereon at its end below the journal bracket 114 a grooved cam 122 drivingly engaging a cam pin or roller 123 on the arm 119 between the pivots 118 and 121. The cam driven linkage is thus adapted to multiply the throw of the roller 123, whereby a small cam may be employed for reciprocating the turntable, and to provide a straight line drive for the reciprocation of the turntable.

Thus when the motor 98 is energized, it drives the sleeve 90 whereby to rotate the shaft 88 and the turntable 84. When the shaft 115 of the driving and timing means K is rotated, it rotates the grooved cam 122 which during each half revolution operates the links or arms 108 and 119 to raise and lower the turntable to and from playing relationship with the reproducer. In the raised position of the turntable, as shown in Figs. 1 and 4, the weight of the turntable acting about the pivot 121, which is held against vertical movement by the pin 123 engaging in the groove of the cam 122 and against horizontal or lateral movement by the arm 119 secured to the fixed pivot 118, results in an upward force acting longitudinally of the arm 112 which, as shown in Fig. 4 is in its "dead center" position with respect to such a force. At the same time the weight of the turntable acting at the pivot 121 about the pin 123, which is held against vertical movement by the groove of the cam 122 and against horizontal movement by the arm 119 being secured to the fixed pivot 118, results in an upward force on the frame bracket 114. Although the turntable is readily reciprocable as already described, it will thus be seen that it is rigidly held in playing position by the cam driven linkage 108, 112, and 119.

*The record carriers*

As shown best in Figs. 2 and 23, the record carriers I are preferably of the ring-shaped type affording edge support for the respective records. Each of them, generally considered, comprises a record supporting ring 124 with an upstanding flange 125 at its periphery and with an internal diameter greater than the diameter of the turntable 84, and novel means (Figs. 1, 2, 4, 14, and 23) for loosely pivoting the record carrier on a rotatable shaft 126 journaled at its lower end in the frame N and extending upwardly through an aperture 127 forwardly and laterally of the turntable shaft aperture 89 in the panel D. That shaft 126 is reduced at the region slightly above the panel D to provide a lower shoulder 128 and is further reduced at its upper end to provide an upper shoulder 129, and the shaft has a keyway 130 extending longitudinally thereof between the shoulders 128 and 129.

Each record carrier is so constructed as to provide a plurality of supports which may be pivotally arranged in spaced relation along the shaft 126, whereby to reinforce the record carrier against sagging. Accordingly, each record carrier is provided with an arm or projection 131 extending substantially radially outward from its periphery and connecting at its outer end with a mounting strip having spaced oppositely extending parallel arm portions 132 and 133 substantially at right angles to the arm 131 and an inclined portion 134 connecting the inner ends of the arm portions. The arm portion 132 of each record carrier may be welded or otherwise suitably secured to the arm 131 and the inclined connecting portion 134 may extend upwardly as shown in the upper part of Fig. 4, or downwardly as shown in the lower part of Fig. 4. When the portion 134 extends upwardly, its arm portion 133 may be called an upper arm portion; and when it extends downwardly, its arm portion 133 may be called a lower arm portion. The outer end of each arm 133 is provided with an aperture 135 to facilitate mounting the record carrier to swing about the shaft 126.

Cooperating with each of those arms 131 and their respective mounting strips, an arm or projection 136 is provided on the record carrier to project outwardly therefrom, and is substantially parallel to and angularly spaced from the arm 131. That arm 136 at its outer end is formed to provide a horizontally disposed disc-like or dished member 137 in the plane of the record carrying portion of the record carrier and vertically spaced from the outer end of the arm portion 133. The dished disc provides an upstanding peripheral wall or flange 138 having a slot 139 therein, and cut away or otherwise relieved for about 90 degrees to provide a shoulder 140 spaced from the slot. Each disc 137 is provided with an aperture 141 which is coaxial with the aperture 135 and which cooperates therewith in mounting the record carrier to swing about the shaft 126.

The aperture 135 of each lower arm portion 133 has arranged therein a boss or hub member 142 which has a shaft aperture 143 loosely fitting the shaft 126 below the shoulder 128 and which is provided with a reduced end portion 144 providing a shoulder 145 intermediate its ends. The reduced end portion 144 may be inserted in the aperture 135 until the arm portion 133 engages the shoulder 145 whereupon the peripheral margin of the reduced portion may be formed to provide a peripheral flange 146 spaced from the shoulder 145 and a spacer portion 147 coaxial with and at the side of said flange 146 opposite the shoulder 145. The flange 146 cooperates with the shoulder 145 to retain the boss member in the aperture 135. Similar boss members are arranged in the aperture 135 of the respective upper arm portions 133, but, as shown in Fig. 4, they are preferably inverted with respect to the first mentioned boss members and the shaft apertures. Those inverted boss members 142 loosely fit the shaft 126 above the shoulder 129.

Each dished disc 137 has associated therewith a spacer 148 having a shaft aperture 149 therethrough which slidably fits the shaft 126 between the shoulders 128 and 129, and having internal keying means 151 cooperating with the keyway 130 in that portion of the shaft for fixing the spacer on the shaft to rotate therewith. Each such spacer has a reduced end portion 152 loosely fitting in the aperture 141 of the disc 137 and a larger spacer portion 153 provided with a slot or keyway 154 in its periphery.

Preferably the stack of record carriers is assembled in a jig with the spacer portions 153 in the dished discs 137 and with the reduced end portions 152 depending therefrom into the apertures 141, respectively, whereby the end of each reduced portion 152 is flush with the bottom surface of the disc 137. A spacer 155 (like the spacers 148, and adapted to fit loosely on the shaft 126 above the shoulder 128), a dished disc 156, non-rotatable and without any record carrying attachments or members, and a spacing washer 157 are interposed between the lowermost disc 137 and the uppermost arm portion 133 connected to the downwardly inclined connecting portion 134. Likewise an inverted spacer 158 (like the spacers 148 without the internal keying means 151 and adapted to fit loosely on the shaft 126 above the shoulder 129), an inverted dished disc 159 (like the disc 156), and a spacing washer 161 are arranged outwardly of the uppermost disc 137 forming a part of a record carrier.

A plurality of the novel record carriers thus assembled are arranged in superposed relation on the shaft 126 as best shown in Fig. 4, between supporting and retaining collars 162 and 163 fixed as at 164 and 165 on the shaft, and preferably with the connecting portions 134 of half of them arranged to extend downwardly at an inclination to the respective arm portions 132 and with the other connecting portions extending upwardly from their respective arm portions 132. In that manner the column of carriers is not only symmetrical, but requires a shorter length of the shaft 126 above the panel D because the aperture 127 in the panel D may, as shown in Fig. 4, be of such shape and dimensions as to permit the use of a portion of the shaft 126 below the lowermost record carrier for pivotally receiving thereon some of the arm portions 133.

Thus the record carriers are loosely pivoted on the shaft 126 and are held against movement longitudinally thereof by the collars 162 and 163 and any one of them may be drivingly coupled with the shaft by keying means engaging in the slot 139 of the disc 137 and the slot 154 of the corresponding spacer 148 which is locked to rotate with the shaft by the keying means 151 engaging in the keyway 130. Such means will be described presently in connection with the novel selector.

Normally the record carriers I are in stack or superposed relationship laterally of the turntable as shown in Fig. 2 and when one of them is locked to rotate with the shaft 126 as just described, that record carrier is swung to a position over or in the path of the turntable. After the played record is returned to that record carrier, it is swung back to its stack position. Preferably, therefore, the shaft 126 is rockable through an angle for so swinging the record carrier. For that purpose the lower end of the shaft 126 under the panel D has a crank arm 166 fixed as at 167 thereon (see Figs. 4, 14, 20, and 21) which has at its outer end a pivotal connection 168 with an end of an arm or link 169. The opposite end of that arm 169 has a pivotal connection 171 with the outer end of a crank arm 172 fixed at its other end on a stub shaft 173 which is journaled as shown in Fig. 4 in the frame N adjacent the driving and timing means K and which carries a gear 174. Rotation of the gear 174 through 180° rotates the stub shaft 173 and the crank arm 172 a like amount whereby to rotate the shaft 126 sufficiently to swing a record carrier from its stack position to its delivery position over the turntable. The next 180° of rotation of the stub shaft by the gear 174 operates the crank arm 172 to reverse the direction of rotation of the shaft 126 whereby to return the record carrier to its stack position.

The selector

As best shown in Figs. 14 to 19, the novel selector comprises means coacting with the dished discs 137 for normally retaining the record carriers I in superposed or stack relationship, and operable for coupling the record carriers to the rockable shaft 126; means for operating the first mentioned means; means driven from the driving and timing means K for driving the operating means; and the selector control means L for controlling the operating means, whereby any predetermined record carrier, and hence the record therein, may be selected and the operating means may be driven to cause the first mentioned means to release the selected record carrier and to couple it to the rockable shaft 126. Such a selector may be assembled on a suitable subframe or chassis, generally denoted by the reference character O.

That subframe O is cast or otherwise suitably formed to provide a base portion 175 of generally trapezoidal configuration, an upstanding rear member or bracket 176 at one of its parallel sides, an upstanding front member or bracket 177 at the other parallel side of the base portion 175, and a third upstanding member or bracket 178 between the center of the base portion 175 and the front bracket 177 and considerably longer than either of the brackets 176 or 177. In securing the subframe O in the position shown in Fig. 14 the rear bracket 176 of the subframe is secured as at 179 to the forward side of that portion of the frame N forming a bearing for the shaft 126.

When the subframe is so secured to the frame N, the base portion 175 extends forwardly of the shaft 126 and into an aperture 181 in the front wall of the cabinet A between the sight opening B and the sound escape opening C, thus locating the bracket 177 in that aperture, and the bracket 178 extends upwardly through the aperture 127 in the panel D forwardly of the discs 137. At a level above the inverted disc 159, the bracket 178 is provided with an arm 182 extending laterally inwardly toward the shaft 126 and having at its inner end a depending lug 183. That depending lug 183 has secured thereto the upper end of a comb-like member 184, as at 185, which extends downward, alongside the discs 137 to a forwardly extending bracket arm or member 186 at the upper end of the rear bracket 176 of the subframe O and which is suitably secured to that bracket arm 186 as shown at 187 in Fig. 15.

The comb-like member 184 comprises an upstanding body portion 188 having a plurality of teeth or arm 189 which are horizontally disposed and each of which is provided at its outer end with an upstanding lug 191 to provide a slot 192 between each lug 191 and the body portion 188. One such tooth 189 and one slot 192 are provided by the comb-like member 184 slightly below the level and forwardly of each dished disc 137 and they cooperate with the slots 139 in the discs 137 and with guiding means for providing operable latching means to facilitate releasably retaining the corresponding record carrier in stack, releasing that record carrier, and coupling it to the shaft 126. Arms or brackets 190 are provided on the body portion 188 at the levels of the non-rotatable discs 156 and 159 to which the brackets 190 secured to lock the discs 156 and 159 against rotation.

It is at present preferred to provide such guiding means in the form of a pair of angle members 193 for each disc 137, each angle 193 having angularly disposed arms 194 and 195. One pair of the angle members is secured in spaced relation by welding or otherwise fastening the arm 194 of each such angle member to the lower face of the bottom of disc 137 so that the arms 195 of each pair of angle members extends downwardly toward the next lower dished disc 137 at opposides of the disc radius intersecting the center line of the slot 139 in the wall 138 of the disc carrying that pair of angle members. In such an arrangement, the record carriers 1 may be adjusted about the shaft 126 to bring the respective slots 139 in the disc 137 into alignment with the slots 192 in the teeth of the comb-like member 184. When all of the record carriers are so adjusted, they will be in stack relation laterally of the turntable and a vertical plane passing through the axis of the shaft 126 and the vertical center lines of all of the slots 192 will pass through the center lines of all of the slots 139 and between and equidistant from the spaced arms 195 of each pair of angle members 193. In other words, all of the slots 139 in the discs and all of the guideways formed by the pairs of angle members 193 are respectively vertically aligned and from the axis of the shaft 126 radially outwardly, each guideway is aligned with the slot 139 in the next lower disc 137 and with the slot 192 in the comb tooth corresponding to the disc 137 carrying the angle members providing that guideway.

For releasably retaining the record carriers 1 in stack as just described, a plurality of selector members or keys 196 are provided, each being provided with a slot 197 near an end thereof, a slot 198 spaced from the slot 197 a distance equal to the distance between the aligned slots 139 and 192, and a slot 200 at the opposite side of the slot 198 from the slot 197. One such selector key, arranged with the slot 197 near its outer end and facing downward, is inserted end-on into the aligned slots 139 and 192, under each disc 137, and into each guideway formed by the angle members 193, and the keys are moved inwardly until each slot 200 in the key registers with the slots 139 in the peripheral flange 138 of the next lower disc 137. In that position the slots 197 will be forwardly of the comb-like member as shown in Fig. 15; the slots 198 will be between the comb-like member and the peripheral flanges 138 of the discs 137; and the inner ends of the keys 196 will be aligned with and adjacent the open sides of the slots 154 in the respective spacers 148. The inner ends of the keys 196 may be supported and yieldably held out of engagement in the slots 154 by springs or other resilient means 199 each passing through an aperture 201 in each key and elongated apertures 202 in the respective arms 195 of each pair of angle members 193 and having its ends secured as at 203 to the lower face of the bottom of the disc 137 at opposite sides of the angle members 193.

Thus that portion of each key 196 between the slots 197 and 198 therein is normally engaged in the corresponding slot 192, and the slot 200 of each key 196 inwardly of the slot 198 normally registers with the slot 139 in the wall 138 of the disc 137 next below the disc 137 carrying the key. In that manner the discs and hence the record carriers are releasably latched against rotation, and each is rotatable, when released, by virtue of the registration of the slot 200 with the slot 139 in the next lower disc 137. All of the keys 196 are individually movable against the action of their respective springs 199 to engagement in the respective slots 154 and to a position at which each slot 197 registers with the corresponding slot 192 in the comb-like member and each slot 198 registers with the slot 139 in the disc 137 next below the disc carrying the key 196, whereby the discs and hence the record carriers are released and may be rotated about the axis of the shaft 126. During such rotation of any record carrier, the key 196 fixed to the bottom of the corresponding disc 137 rotates with the disc, the slot 197 being so dimensioned as to cause the key to clear the upstanding lug 191, and the slot 198 being adapted to receive therein that portion of the peripheral flange 138 (of the disc 137 next below the disc being rotated), between the slot 139 and the shoulder 140 and being dimensioned so that the shoulder 140 of the next lower disc serves as a stop to limit the rotation of the key and hence the disc and record carrier in a record delivering direction. That peripheral flange thus cooperates with the slot 198 in the key to hold the key in its latched position against the action of the spring 199 during the swinging of the record carrier and when the carrier is returned to stack the spring 199 moves the key to its normal or unlatched position at which the slot 200 registers with the slot 139 in that next lower disc 137.

The means for operating the keys 196 comprises a plurality of one-tooth gears or cams 204 each of which has a tooth 205, and which, in alternating relationship with a plurality of spacers 206, are keyed as at 207, in a reduced end portion 208 of a shaft 209 between a shaft shoulder 211 and a retaining collar 212 secured as at 213 on the shaft outwardly of the gears 204. The gears are spaced apart a distance equal to the vertical distance between succeeding keys 196 and are arranged with the teeth 205 of succeeding gears progressively angularly displaced from the tooth of each preceding gear so that as shown in Fig. 15 the teeth 205 are spaced along and about the longitudinal axis of the shaft 209.

The shaft 209 is slidably journaled at its upper end in the subframe member 182 and extends downward therefrom to vertically yieldable means including the upper end of a rotatable shaft 214. That shaft 214 is journaled intermediate its ends in the subframe member 175, with its upper end slidably receivable in a socket or recess 215 in the lower end of the shaft 209, which communicates at its inner end with a bleed leak or aperture 216 in the shaft 209 and communicating with atmosphere. A coil spring 217 about the shaft 209 is interposed between a driving ratchet or gear 218 on the rotatable shaft 214 and the control means for the selector and a key 219 is inserted in cooperating keyways 221 and 222 in the socket 215 and the upper end of the shaft 214, respectively, whereby the shaft 209 is drivingly coupled to the shaft 214 for rotation therewith and the shaft 209 is capable of a limited reciprocable movement longitudinally thereof.

In the normal position of the shaft 209 the gears 204 are at the same levels as the respectively corresponding keys 196 so that if the shaft were rotated a complete revolution, the teeth 205 would successively cam the respective keys 196 to engagement in the slots 154. The shaft 209 may, however, be depressed, the spring 217 being yieldable, until the gears are below the respectively corresponding keys 196 but above the next lower keys 196, respectively. The depressed shaft may then be rotated to position the desired tooth 205 adjacent and below the corresponding key 196, whereupon the depressed shaft may be released and the spring 217 will move it to its normal position. Further rotation of the restored shaft 209 will then cause the positioned tooth 205 to operate the corresponding key 196 whereby to select a record carrier I and hence the record carried thereby.

For driving the shaft 214 to rotate the shaft 209 as just described, the shaft 214 below the subframe member 175 has fixed thereon as at 223 to rotate therewith a collar or sleeve 224 with a socket or recess 225 in its lower end and with an external peripheral flange 226 at its lower end. Spaced below the flange 226 of the collar 224 on the shaft 214 is another collar 227 having at its upper end an external peripheral flange 228 and held thereon by a retaining collar 229 fixed on, as at 231, the lower end of the shaft 214 to rotate therewith. The lower end of the collar 227 is provided with a depending lug 232 engaging in a slot 233 in the retaining collar 229 for keying the two collars together for rotation with the shaft 214.

Between the flanges 226 and 228, a bevel gear 234 is loosely carried on the shaft 214 and is provided with a hub portion 235 extending axially of the shaft into the socket 225 and with a shoulder or flange 236 which is complementary to the flange 226 and with a surface 237 at the other end of the bevel gear 234, complementary to the flange 228. A friction washer 238 is interposed between the flanges 226 and 236 and another friction washer 239 is arranged between the flange 228 and the surface 237 for frictionally and yieldably transmitting rotary motion from the bevel gear 234 to the shaft 214 by way of the friction washers 238 and 239 and the collars 224, 227, and 229. When the depressed shaft 209 during rotation by the gear 234 is released, the spring 217 returns it to its normal position. The positioned cam tooth 205 thereupon engages the corresponding key 196 and interrupts the rotation of the shaft 209 and its drive shaft 214, the engagement between the cam tooth and the key causing slipping at the yieldable couplings 238 and 239 between the driven gear 234 and the shaft 214. The ratchet or gear 218 may thereafter be utilized to rotate the shaft 209 and cause the positioned cam tooth to operate the key 196.

Thus rotation of the gear 218 or of the gear 234 may rotate the shaft 209, and both the gear 218 and the gear 234 are driven to rotate the shaft 209 in operating the cams 204 to select records. The gear 234, in selecting a record, is driven to position the desired cam 204 with its tooth 205 adjacent the corresponding key 196, whereupon the gear 218 is driven to cause the tooth 205 to cam the key 196 to its latching or selecting position.

For thus driving the gear 234, a bevel gear 241 is fixed in driving engagement with the gear 234 on the end of a shaft 242 which is journaled at that end in a bracket 243 supported by the frame N at the lower end of the shaft 126 and which is journaled at its opposite end in an arm 244 on the flange portion 116 above the hub portion 117. That shaft 242 has a worm gear 245 fixed thereon near the arm 244 and meshing with a gear 246 which is carried on to rotate with a lower end of a hollow spindle 247 journaled as shown in Fig. 6 in the frame N near the worm 96, and at the side thereof opposite the sleeve 90. That spindle 247 carries a worm wheel 248 fixed thereon to rotate therewith above the gear 246 and meshing with the worm 96, whereby the motor 98 in driving the worm 96 will drive the worm wheel 248, the spindle 247, the enmeshing gears 245 and 246, the shaft 242, and the enmeshing gears 234 and 241 and may thereby rotate the shaft 214 to rotate the shaft 209 for positioning the cam teeth 205 in operative relationship with their respectively corresponding keys 196.

To drive the gear 218 for causing the teeth 205, after they have been respectively positioned as just described, to operate the respectively corresponding keys 196, an elongated reciprocable member 249 is slidably supported at one end in an apertured bracket or arm 251 on the subframe member 175 rearwardly and at a side of the gear 218. That reciprocable member 249 extends from its supporting bracket 251 toward the driving and timing means K and at its end opposite the bracket 251, the reciprocable member 249 is slidably supported in an apertured bracket 252 secured, as shown in Figs. 4 and 21, to the outer wall of a shaft bearing 253 provided in and centrally of the frame N. A spring urged pawl 254 is pivoted on the end of the member 249 supported in the arm 251 for drivingly engaging the ratchet or gear 218 when the reciprocable member 249 is moved to the left as seen in Fig. 21, and for slidably engaging the ratchet 218 when the reciprocable member is moved in the opposite direction. To facilitate operating the reciprocable member 249 whereby to drive the ratchet 218, a lug or pin 255 is provided on that reciprocable member near the bracket 252 and a spring 256 secured at one end to the reciprocable member and at its opposite end to the bracket 252 yieldably holds the reciprocable member with the lug 255 abutting the bracket 252. The reciprocable member may, by means of the lug 255, be operated to the left as viewed in Fig. 21 to drive the ratchet 218, the spring 256 serving to return the reciprocable member until the lug 255 engages the bracket 252 and stops further movement of the reciprocable member to the right.

The selector control means L controls the operating means for the keys 196 whereby any predetermined record may be selected for playing and the record carrier bearing that record will thereafter be operated to move the record to a position over the turntable H. That control means L is shown best in Figs. 1, 2, 14, 16, and 20, and comprises means for depressing the reciprocable shaft 209 preparatory to, and holding it depressed during, the positioning of the desired cam tooth 205 by the gear 234, and means for releasing the depressed shaft 209 when the desired cam tooth 205 is properly positioned with respect to the corresponding key 196 so that the next operation of the ratchet 218 will cause the cam tooth to operate the key 196, thereby latching the record carrier bearing the selected record to the shaft 126 for swinging that record carrier to its delivery position.

Such selector control means in preferred form includes a plurality of discs 257 each stamped or otherwise formed to provide a peripheral ridge or flange 258 extending laterally from one face thereof, an inclined peripheral wall 259, and a slot 261 in the peripheral wall 259 and extending inwardly toward the center of the disc. One of those discs 257 for each two record carriers I is arranged on, to rotate with, the shaft 209, with a suitable spacer 262 between succeeding discs, in such a manner that the slot 261 of each disc is angularly displaced, as shown in Fig. 16, about the axis of the shaft with respect to the slot in the next succeeding disc. That angular spacing between the slots in the succeeding discs 257 is twice that between the teeth 205 of succeeding cams 204. The assembly of discs 257 and spacers 262 is fixed longitudinally of the shaft between a shaft shoulder 263 at the upper end of the spring 217 and a retaining washer or collar 264 for cooperation with the actuating means for depressing and releasing the reciprocable shaft 209.

A plurality of vertically spaced, reciprocable plungers 265 are slidably arranged in respectively alinged apertures 266 and 267 provided for that purpose in the subframe members 177 and 178, respectively, one such plunger 265 being provided at about the level of each disc 257. Each such plunger 265 is provided at its inner end with a depending finger or lug 268 having its end facing the corresponding disc 257 inclined as shown at 269 in Fig. 14 to provide a cam surface. A button or other suitable actuating means 271 is fitted on the outer end of each plunger 267, outside the cabinet A, to facilitate moving the plunger inwardly to engagement with the corresponding disc 257 against the action of a coiled spring 272 on each plunger between the button 271 and the subframe member 178.

Figure 14:
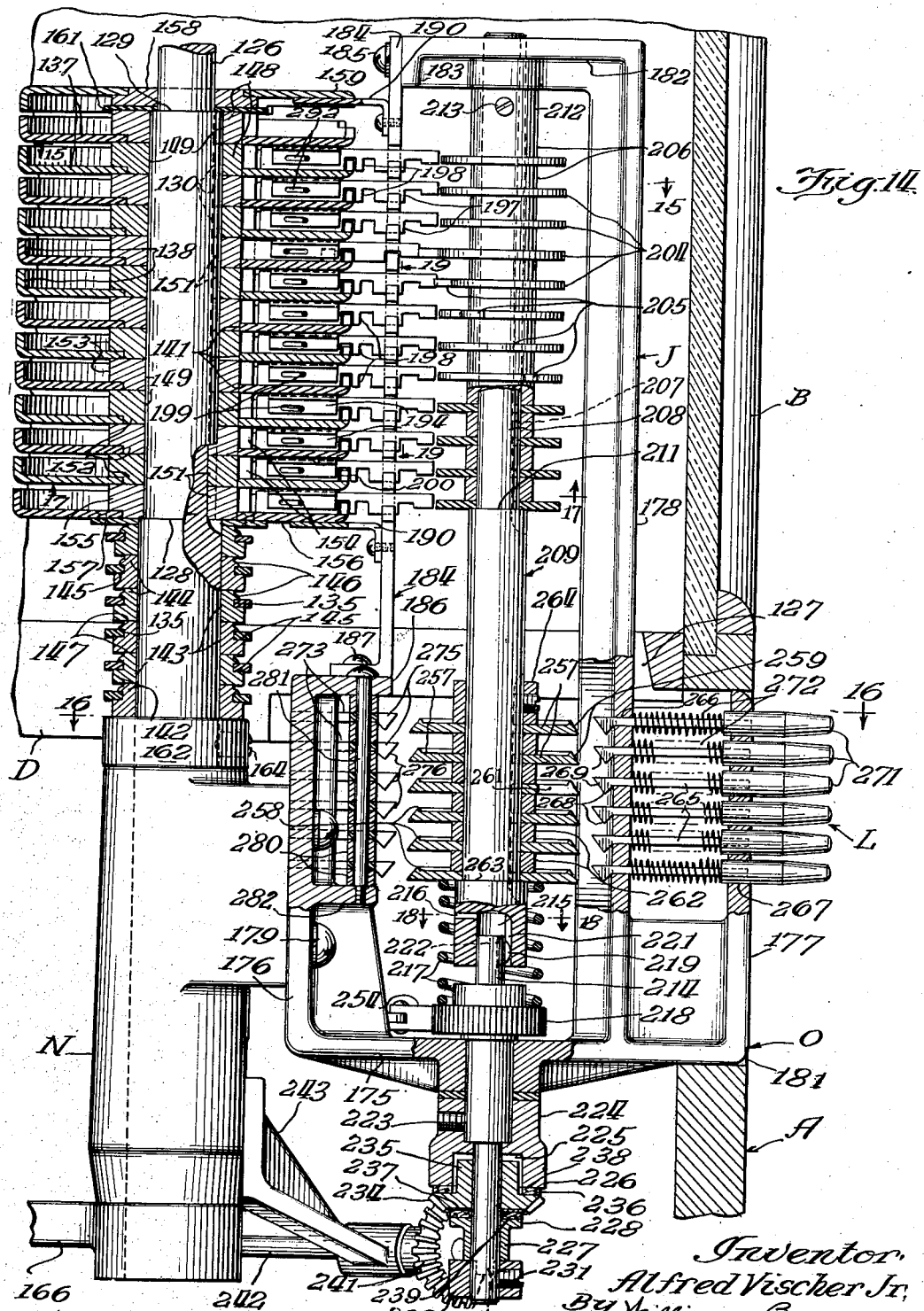
Fig. 14 is a side elevation partially in cross section showing the novel selector in operative relation with a plurality of the novel record carriers which are shown in greater detail in Figs. 2 and 4.

The subframe member 176 carries a plurality of vertically spaced, reciprocable plungers 273 which are slidably arranged in apertures 274 in the subframe member, one such plunger being provided at about the level of each disc 257 and at the diametrically opposite side thereof from the corresponding plunger 265. Each such plunger 273 is provided at its outer end with a depending finger or lug 275 which, like the fingers 268, has its end facing the corresponding disc 257 inclined as shown at 276 in Fig. 14 to provide a cam surface. For reciprocating the plungers 273 each of them is provided intermediate its ends with an upstanding pin or stud 277 which, as shown in Fig. 16, is engaged in a bifurcated end 278 of a lever 279. The levers 279 are pivoted intermediate their ends with alternating spacers 280 as shown in Figs. 14 and 16, on a common pivot pin 281 extending between the subframe bracket arm 186 and a lug 282 spaced therebelow at one side of, and projecting forwardly from, the subframe member 176.

The end of each lever 279 opposite the bifurcated end 278 has a pivotal connection 283 with the inner end of a reciprocable rod or other suitable member 284 which extends outwardly from their pivotal connections 283 with the levers 279 and which are slidably supported in spaced, vertical alignment in apertures 285 and 286 in the subframe members 177 and 178, respectively. Those apertures 285 and 286 are spaced laterally from the corresponding apertures 266 and 267, respectively. Each rod at its outer end, outside the cabinet A is fitted with a button or other suitable actuating means 287 for moving the rod to move the plunger 273 outwardly to engagement with the corresponding disc 257 against the action of a coiled spring 288 on each rod between the button 287 and the subframe member 178.

Pushing a button 271 or the corresponding button 287 causes the cam surface 269 or, as the case may be, the cam surface 276 to engage the inclined peripheral wall 259 of the corresponding disc 257 and to cam the disc and hence the shaft 209 in a downward direction against the action of the spring 217. In thus depressing the shaft 209 the depending finger 268 or 275 moves beyond and interlocks with the lateral flange or ridge 258 on the disc 257, thus holding the shaft 209 in its depressed position and latching the button 271 or 287 in its inner or selecting position against the action of the spring 272 or 288. It will be remembered that in the depressed position of the shaft 209, the cams 204 are below their respectively corresponding keys 196 so that during the rotation of the depressed shaft the cam teeth 205 do not engage the keys 209.

The depressed shaft 209 may therefore be rotated until the slot 261 in one of the discs 257 corresponding to the operated plunger 265 or 273 is brought into registration with the operated plunger, whereupon the spring 272 or 288 returns the button 271 or 287 to its normal non-selecting position, and the depressed shaft 209 is released. The spring 217 thereupon elevates the shaft 209. The slots 261 in the discs 257 and the cam teeth 205 are so related with respect to the axis of the shaft 209 that when the slot 261 in one of the discs 257 releases an operated plunger 265, a corresponding one of the cam teeth 205, upon the ensuing elevation of the shaft 209, will be the next cam tooth to engage its key 196 and to interrupt the rotation of the shaft by the gear 234, and when the slot 261 in the same disc 257 releases the corresponding plunger 273 (if operated), a different predetermined one of the cam teeth 205 upon the ensuing elevation of the shaft 209 will be the next cam tooth to engage its key 196 and to interrupt the rotation of the shaft by the gear 234. Thus with half as many discs 257 as record carriers I, the novel selector control L may selectively position the cam teeth 205 in engagement with their respectively corresponding keys 196 for operation by the ratchet 218 to select the record carrier bearing the desired record.

*The driving and timing means*

An important feature of the present invention is the novel and simplified driving and timing means K which is driven from the motor 98. Although the driving motor 98 operates continuously throughout a complete cycle of the novel phonograph, the driving and timing means K includes cooperating clutch means and control means, and mechanical means which, when driven from the motor 98, drives the selector operating means responsive to the selector control means L to select the record indicated thereby and to couple the record carrier bearing that record to the rock shaft 126; thereafter drives the rock shaft 126 to swing the record carrier bearing the selected record to the delivery position over the turntable; drives the cam 122 to raise the turntable through the record carrier in delivery position, whereby to remove therefrom the selected record and to move that record to playing engagement with the reproducer; after the record is played, resumes the driving of the cam 122 to lower the turntable through the record carrier in delivery position to deposit thereon the played record, thus permitting the automatic return of the reproducer to its starting position, as already described; and resumes driving the rock shaft 126 to return the record carrier with the played record to stack.

As shown best in Figs. 4, 20, and 21, the mechanical drive means just mentioned preferably is a Geneva or other suitable intermittent drive and comprises a shaft 289 which, as shown in Fig. 6, is rotatably arranged in the hollow spindle 247 and is journaled as at 291 in the frame N. That shaft 289 has a drive pinion or gear 292 cut or otherwise formed at its upper end and depends therefrom beyond the lower end of the spindle 247 where it may be coupled in driving relationship with the spindle by suitable clutch means 293. It will be understood that when the clutch means 293 couples the shaft 289 and the spindle together, the motor driven worm 96, in driving the spindle through the worm wheel 248, will drive the shaft 289.

A preferred form for the clutch means 293 is illustrated in Figs. 6, 7, and 8 as comprising an outer, hollow drum 294, a roller carrying member 295, and an inner clutch member 296 which are assembled about the lower end of the shaft 289 in operative relationship. The outer hollow drum 294 has the gear 246 cut or otherwise formed in its outer wall and is provided with a hub portion 297 embracing and fixed on, to rotate with, the lower end of the spindle 247. The roller carrying member 295 is rotatably receivable in the drum 294. That member 295 is provided with an external flange 298 intermediate its ends, and has an internal shoulder 299 which is engaged by an external flange 301 at the lower end of the inner clutch member 296 when it is fixed on, to rotate with, the shaft 289 inside of the member 295 for securing the member 295 against movement outwardly of the drum 297.

For coupling the drum 294 in driving relation to the inner clutch member 296, when it is desired to drive the shaft 289 from the sleeve 247, the roller carrying member 295 and the inner clutch member 296 are provided with a plurality of complementary slots 302 and 303, respectively, which extend longitudinally thereof from their respective upper ends and which with the inner surface of the outer drum member 294 form vertically elongated chambers or passages that, in plan or end view, are substantially trapezoidal in outline. In each of those passages, the clutching means 293 has an elongated roller 304 of such diameter with respect to the varying distance between the inner wall of each slot 303 and the inner wall of the drum 294 that when the roller is in that side of the chamber lagging relative to the direction of rotation of the drum 294, the inner clutch member 296 is not driven but is uncoupled from the drum 294. When, however, the rollers 304 move to the side of the respective chambers leading relative to the direction of rotation of the drum 294, they are wedged between the forward portions of the inner walls of their respective slots 303 and the inner wall of the drum 294, thus coupling the inner clutch member 296 to the drum 294 for rotation therewith.

A spiral spring 305 fixed at its inner end 306 to the shaft 289 and at its outer end 307 to the roller carrying member 295 normally urges the member 295 in a direction to move the rollers 304 into wedging relation between the drum 294 and the inner clutch member 296. That spring 305 cooperates with a lug or projection 308 on the flange 298 to operate the clutching means 293, as will be more fully described hereinafter.

Meshing with the pinion 292 at the upper end of the shaft 291 is a relatively large gear 309 fixed on to rotate with the upper end of a shaft 311 which is journaled in the shaft bearing 253 (Figs. 4, 20, and 21) of the frame N and which has spaced therebelow a disc 312 that is also fixed on the shaft 311.

As shown in Figs. 4 and 20 the spaced, coaxial gear 309 and disc 312 cooperate to carry Geneva driving elements or pins R, S, and T, the pin R comprising a bolt 314 passing upwardly from below the disc through a collar 315 under the disc, through the disc, and through a collar 316 between the gear and the disc and threading into the gear 309. The pin S includes a bolt 317 angularly spaced from the bolt 314 in a clockwise direction about the axis of the shaft 311 and passing upwardly from below the disc 312 through a collar 318 under the disc and threading into the disc; and the pin T comprises a bolt 319 angularly spaced from the bolt 317 in a clockwise direction about the axis of the shaft 311 a greater distance than that separating the bolts 314 and 317, and passing upwardly from between the gear 309 and the disc 312 through a collar 321 between the gear and the disc and threading into the gear.

The shaft 311 has fixed on its lower end for rotation therewith below the bearing 253, a contact operating cam or disc 322 having diagonally opposite slots 323 in its periphery for operating a pair of electrical contacts carried by resilient members 324 which are insulated from one another and may be suitably supported for operation, as illustrated at 325 in Fig. 21, by the frame N and which are connected by electrical conductors 326 to the control circuit as shown in Fig. 29. The periphery of the disc 322 is adapted to engage the contact arms 324 for closing them, and when either slot 323 registers with the contact arms, the resiliency thereof causes them to spring apart and interrupt the electrical contact.

Between that disc 322 and the lower end of the shaft bearing, the shaft 311 has fixed thereon to rotate therewith an insulating disc 322' (see Fig. 29) having a notch or slot 323' cut in its periphery. That disc is adapted to operate a pair of electrical contacts carried by resilient members 324' electrically connected by conductors 325' and 326' in parallel with or shunting the switch 104. The periphery of the disc 322' holds the contacts closed whereby the motor 98 will be energized, and when, during the rotation of the disc with the shaft 311, the slot 323' registers with the operating contact member 324', the resiliency of the contact members causes the motor circuit to be broken.

Those Geneva driving pins, R, S, and T are adapted to drive, intermittently and sequentially, a record carrier operating Geneva wheel or cam 327 and a turntable reciprocating Geneva wheel or cam 328. Each of the Geneva wheels, as shown in Fig. 20, may be derived from a square or rhomboidal plate with a pin receiving slot 329 cut or otherwise formed in the plate at each vertex and extending toward the center of the plate, and with the margins between succeeding slots 329 cut out or otherwise removed to provide arcuate concave edges 331.

The Geneva wheel 327 is keyed on to rotate with the upper end of a vertical shaft 332 suitably journaled in the frame N rearwardly adjacent the disc 312 and below the gear 309, and is arranged on the shaft 332 at the level of the collar 315 of the pin R and the collar 318 of the pin S and at the level of a mutilated disc 333 which is fixed on the shaft 311. The dimensions of the Geneva wheel 327 are such that when it is so positioned on the shaft 332, the Geneva wheel extends partially under the disc 312 so that each of the pins R and S will, during one revolution of the gear 309 and the disc 312, engage in a pin receiving slot 329 and will rotate the Geneva wheel about the axis of its shaft 332 through about a quarter of a revolution.

When neither the pin R nor the pin S is driving the Geneva wheel 327, it is positively locked against rotation by the mutilated disc 333 which is formed with an arcuate convex edge portion 334 complementary to and lockingly engageable with the concave edges 331 of the Geneva wheel for that purpose, and which has about 180° of its periphery cut away or formed to provide adjacent, arcuate, concave edge portions 335 that release the Geneva wheel to permit it to be driven by the pins R and S, respectively. That mutilated disc 333 is provided with a lug or other projection 336 depending from its lower face for engaging the pin 255 to operate the reciprocable member before each operation of the Geneva wheel 327 by the pin R.

When the pin R or S engages in a slot 329 of the Geneva wheel 327 and the Geneva wheel is rotated a quarter revolution as already described, the shaft 332 carrying the Geneva wheel is rotated a quarter revolution thereby. That shaft 332 has fixed on to rotate with its lower end, a gear 337 which meshes with and is adapted to drive the gear 174. The gear ratio between the gears 174 and 337 is such that, for every quarter revolution of the gear 337, the gear 174 is driven a half revolution which causes the shaft 173 and hence the crank arm 172 to rotate through 180°. That motion of the crank arm is transmitted by the link or arm 169 to the crank arm 166 and hence the rock shaft 126 for swinging a record carrier from the stack to its delivery position when it is the pin R which actuates the Geneva wheel 327, and for returning the record carrier from its delivery position to the stack when it is the pin S which actuates the Geneva wheel 327.

The Geneva wheel 328 is keyed on to rotate with the upper end of the shaft 115 which, it will be remembered, carries at its lower end the cam 122 for reciprocating the turntable. The shaft 115 carries the Geneva wheel 328 at the level of the collar 316 of the pin R and the collar 321 of the pin T and at the level of a mutilated disc 338 fixed on the shaft 311. The dimensions of the Geneva wheel 328 are such that when it is so positioned on the shaft 115, the Geneva wheel extends into the space between the gear 309 and the disc 312 so that each of the pins R and T will, during one revolution of the gear 309 and the disc 312, engage in a pin receiving slot 329 and will rotate the Geneva wheel 328 about the axis of its shaft 115 through about a quarter of a revolution. The Geneva wheel 328 is, with reference to the shaft 311, angularly spaced from the Geneva wheel 327 in the direction of rotation of the gear 309 a distance such that the pin R, which is adapted to drive both Geneva wheels, in leaving a slot 329 in the Geneva wheel 327 after having rotated that Geneva wheel a quarter of a revolution, is entering a slot 329 in the Geneva wheel 328 for thereafter rotating it a quarter of a revolution.

When neither the pin R nor the pin T is driving the Geneva wheel 328, it is positively locked against rotation by the mutilated disc 338 which is formed with an arcuate convex edge portion 339 complementary to and lockingly engageable with the concave edges 331 of the Geneva wheel for that purpose, and which has about 180° of its periphery cut away or formed to provide adjacent, arcuate, concave edge portions 341 that release the Geneva wheel to permit it to be driven by the pins R and T, respectively.

When the pin R or T engages in a slot 329 of the Geneva wheel 328 and the Geneva wheel is rotated a quarter of a revolution as already described, the shaft 115 carrying the Geneva wheel is rotated a quarted of a revolution and thus the cam 115 is rotated a quarter of a revolution. Each successive quarter revolution of the cam 115 results in a vertical movement of the roller 123 between its extreme positions, which is transmitted by means of the linkage 119, 108 to the reciprocable turntable shaft 88 for moving the turntable between its extreme positions. Thus the turntable 84 may be moved from a nonplaying position to a playing position and returned to the nonplaying position during each operating cycle of the phonograph.

For controlling the clutching means 293 whereby to control the operation of the driven shaft 289 from the sleeve 247, an electromagnet 342 having coil means 343 and an armature 344 pivoted as at 345 intermediate its ends is mounted by any suitable means 346 in proximity to the clutching means 293 on the frame N and rearwardly of the shaft 24. As shown in Fig. 5, that armature 344 comprises a substantially rectangular portion 347 which has a retaining pawl or detent 348 projecting from its pivoted side laterally toward the clutching means 293 for engaging the lug 308 on the flange 298 and holding the roller carrying member 295 of the clutching means in an unclutched position against the action of the spring 305. A spring 349 yieldably urges the armature in a direction to cause the pawl 348 thus to engage the lug 308. The side of the armature opposite the pivot 345 is provided with a finger or lug 351 projecting therefrom in a direction opposite to that of the pawl 348 for cooperation with novel electrical contact operating means which will next be described for operating a pair of electrical contacts carried by resilient contact arms 352 which are insulated from each other and are mounted as shown at 353 in Fig. 21 at the side of the depending bracket 114 opposite the laterally projecting fin 116.

Those contact arms 352 may be electrically connected by conductors 354 to the control circuit as shown in Fig. 29 and one of them extends from its mounting toward the shaft 242 over which that contact arm is bent or formed to provide an operating projection 355 which normally in the contact-open position is adjacent the inner face of an external flange 356 at an end of a sleeve member 357 loosely mounted on the shaft 242 and having at its other end, spaced from the flange 356, a drum or collar portion 358. The inner face of the flange 356 is provided with a finger or projection 359 for engaging the projection 355 during each revolution of the sleeve member 357 to close the contacts on the arms 352.

In order to drive the sleeve member 357 from the shaft 242 for operating those contacts on the arms 352, the worm gear 245 is provided with an integral hub portion 361 embracing the shaft and extending therealong toward the sleeve member. That hub portion 361 at its end opposite the gear 245 is provided with one or more slots 362 each of which is adapted to receive a projection or key 363 at an end of a sleeve 364 loose on the shaft 242 and having at its opposite end an external flange 365 spaced from the flange 356 by a friction spacer or element 366. A coil spring 367 about the sleeve 364 between the hub portion 361 and the flange 365 normally urges the flange 365 against the friction spacer 366.

A retaining collar 368 is fixed as at 369 on the shaft 242 and is spaced from the collar portion 358 of the sleeve member 357 by a friction spacer or element 371 adjacent the retaining collar and by a control member 372 on the shaft 242 between the friction spacer 371 and the collar portion 358.

That control member 372 is stamped or otherwise formed with a radially projecting arm 373 of sufficient length to engage the lug 351 on the armature 344, and with angularly spaced, laterally projecting fingers 374, 375, and 376 at the outer end of the arm 373. The fingers 374 and 376 are at such a radius as to be engageable by the lug 351 when the armature 344 is in the attracted position, and the finger 375 is between the fingers 374 and 376 and at such a radius as to be engageable by the lug 351 when the magnet 342 is deenergized.

The difference between the radii of the finger 375 and the fingers 374 and 376 is such that the control member 372 may rotate with the shaft 242 and during such rotation the finger 375 may clear the lug 351 at one side thereof, and the fingers 374 and 376 may clear it at the opposite side. The rotatable shaft 242 tends to rotate the sleeve member 357 and the control member 372 through the friction elements 366 and 371 whereby to operate and control the contacts on the arms 352. Where one of the fingers 374, 375, and 376 engages the lug 351, the sleeve member 357 and the control member 372 are held against rotation, the friction spacers 366 and 371 permitting slippage between the respective driving and driven members associated therewith.

As shown in Fig. 29, the coil means 343 of the magnet 342 has one of its terminals electrically connected by a conductor 377 to the conductor 107 and another terminal connected by a conductor 378 to a common terminal 379 for one of each pair of the conductors 81, 326, and 354. The other conductor 81 and the other conductor 354 are connected together by a conductor 381.

*Operation*

The coin or token released means M may be of any usual construction and design, several of which are well known to those skilled in this art, and, as shown in Fig. 29 is adapted when operated to close the motor switch 104 for starting the motor 98. When the motor 98 is thus energized, it drives, as already explained, the shaft 88 to rotate the turntable and the spindle 247. The driven spindle 247 drives the outer clutch member 294, causing the gear thereon to drive the gear 245 and hence the frictionally driven sleeve member 357 and the shaft 242.

Upon rotating, the sleeve member 357 brings its contact closing finger 359 into engagement with the operating projection 355 to close the contacts 352 which close or complete a circuit including the conductor 107 connected to the source 102 of energy, the conductor 377, the coil means 343, the conductor 378, the common terminal 379, one of the conductors 354, the contacts 352, the conductor 381, and the conductor 101 back to the source 102. In that manner the magnet 343 is energized and attracts its armature 344 which causes the detent 348 to disengage the lug 308 whereby to release the roller carrying member 295 of the clutch means 293 and to permit the spring 305 to rotate that member 295 to a clutching position.

When the clutch means 293 is thus operated, the shaft 289 is rotated by the spindle 247 and through the enmeshing gears 292 and 309 drives the shaft 311 carrying the Geneva driving elements R, S, and T, the disc 322, and the disc 322'. The resulting rotation of the disc 322 carries one of the slots 323 past the contacts 324 causing the periphery of that disc to close those contacts which completes a circuit including the conductor 107 connected to the source 102, the coil means 343, the conductor 378, the common terminal 379, the contacts 324, and their associated conductors 326, one of the conductors 354, the conductor 281, and the conductor 101 back to the energy supply source 102.

As soon as the shaft 311 begins to rotate, the slot 323' in the disc 322' passes beyond the contacts 324' and the periphery of that disc closes the contacts 324', whereby to maintain the motor circuit after the coin released means M permits the motor starting switch 104 to open; thus the motor 98 will be energized and operating during a complete revolution of the shaft 311 and untill the slot 323' in the disc 322' again registers with the contacts 324' and permits the resiliency thereof to open the contacts.

Meanwhile the sleeve member 357 continues rotating, carrying with it the control member 372 until the finger 374 engages the finger 351 on the attracted magnet armature 344 which stops the rotation of the sleeve member 357 and the control member 372. Since, however, the contacts 324 are closed before the contacts 352 are opened by the continued rotation of the sleeve member 357, the magnet 343 remains energized to keep the detent 348 out of engagement with the clutch operating lug 308.

It will be remembered that the Geneva driving elements R, S, and T rotate with the shaft 311 about the axis thereof. The starting positions of those driving elements with reference to the Geneva wheels 327 and 328 are illustrated in Fig. 24. Before the shaft 311 is clutched in driving relationship with the spindle 247, the shaft 242 driven from the spindle 247 by the enmeshing gears 245 and 246 causes the gear 241 to drive the gear 234 whereby frictionally to drive the shaft 214. That driven shaft 214 rotates the shaft 209 until one of the plungers 265 or 273, previously operated by the associated button 271 or 287, and its cooperating slotted disc 257, release the shaft 209 permitting the spring 217 to raise the shaft until the cams 204 are at the levels of the respective keys 196.

In that position, as already described, the selecting tooth 205 of the cam 204 corresponding to the operated button 271 or 287 is adjacent the key 196 which, upon operation, will key the record carrier bearing the selected record to the rock shaft 126. When cam tooth 205 has thus been positioned, the finger 359 will close the contacts 352, thereby energizing the magnet 343 to operate the clutch means 293 and clutch the shaft 311 in driving relation with the spindle 247. That causes the operation of the driving elements R, S, and T. Before or just as the driving element R reaches driving relation with the slot 329 in the Geneva wheel 327, the mutilated disc 333 rotates with the shaft 311 sufficiently to cause the lug 336 to engage the pin 255 whereby to move the reciprocable member 249 against the action of the spring 256 in a ratchet driving direction, thus causing the pawl 254 to advance the ratchet 218. The rotation of the ratchet 218, as just described, rotates the shaft 214 and thereby the shaft 209 sufficiently to cause the positioned cam tooth 205 to move the key 196 corresponding thereto into keying relationship in the slot 154 of one of the spacers 148.

In that position the operated key 196 has been moved the distance between the slots 198 and 200 therein so that the slot 198 in the operated key is in registration with the slot 139 in the wall of the disc 137 next below the disc associated with the record carrier bearing the selected record, and the slot 197 in the operated key is in registration with the slot 192 in the corresponding comb-tooth 189. The disc 137 associated with the record carrier bearing the selected record may therefore be rotated from the shaft 126 through the medium of the spacer 146 keyed thereto, and of the operated key 196 engaging in the key slot 164 and the guideway formed by the angle members 195 depending from the lower face of that disc, the upstanding wall 138 of that disc during rotation thereof passing through the slot 200 in the key 196 next above the operated key. The other discs 137 are positively locked against rotation by their respective keys 196 in the comb-tooth slots 192.

When the selection of the desired record carrier I and the record therein is effected by the driving and timing means K in accordance with the selector control L, as just described, the driving element R, having moved about 20 degrees from the position shown in Fig. 24 and into the slot 329 of the Geneva wheel 327, drivingly engages that Geneva wheel and rotates it to the position shown in Fig. 25. During that operation of the driving element R, the Geneva wheel 328 remains stationary, since the driving element S travels at a lower level than that of the wheel 328. The Geneva wheel 327 is thus rotated through about 90 degrees.

In rotating from the position shown in Fig. 24 to the position shown in Fig. 25, the Geneva wheel 327 rotates the shaft 332 and thus drives the stub shaft 173 by the enmeshing gears 174 and 337 to rock the shaft 126 sufficiently to swing the selected record carrier I from its stack position to its position above and aligned with the turntable, the rocking of the shaft 126 from the driven stub shaft 173 being accomplished by means of the arm 172, the link 169, and the arm 166. In that position, the operated key 196 is held in keying position, as already described, and is adjacent the shoulder 140 of the wall of the disc next below the operated disc. During the rotation of the shaft 311 in swinging the selected record carrier to its delivery position, as just described, the mutilated disc 333 on that shaft rotates to bring its convex peripheral portion into locking engagement in the concave arcuate portion 331 of the Geneva wheel 327 whereby securely to lock the record carrier operating apparatus in place. The driving and timing means K thus drives the selected record carrier to its delivery position and locks it in that position.

Further rotation of the shaft 311 causes the driving elements R, S, and T to rotate from the positions shown in Fig. 25 to those shown in Fig. 26. During that rotation of the shaft 311, the Geneva wheel 327 remains stationary, since the driving element T travels at a level above the level of that Geneva wheel. The driving element R, however, during such further rotation disengages the Geneva wheel 327 and engages in one of the slots 329 in the Geneva wheel 328 and rotates the latter through about 90 degrees.

In thus rotating from the position shown in Fig. 25 to that shown in Fig. 26, the Geneva wheel 328 drives its shaft 115 hence the grooved cam 122 thereon to operate the linkages 119, 108, and 112 to raise the turntable H from the position shown in Fig. 6 to the position shown in Fig. 4. The turntable H, as will be remembered, is meanwhile rotating and in moving upwardly it passes through the positioned selected record carrier, removing the selected record therefrom, and presents that record to playing engagement with the needle or stylus 172 of the reproducer G.

During the rotation of the shaft 311 in raising the turntable, as just described, the mutilated disc 336 on that shaft rotates to bring its radially projecting portion between its adjacent concave arcuate portions 341 into engagement with, and at about the center of, the concave arcuate portion 331 of the Geneva wheel 328 whereby to cooperate with the linkages 108, 112, and 119 in securely holding the turntable in raised position. The driving and timing means K thus drives the turntable raising means for raising the turntable. The rotation of the shaft 311, in raising the turntable, brings one of the slots 323 in the disc 322 on the shaft into registration with the contacts carried on the resilient members 324 permitting the resiliency thereof to open the contacts whereby to deenergize the magnet 343.

The deenergization of the magnet 343 permits the spring 349 to retract the armature 344 whereupon the detent 348 engages the lug 308 and operates the clutch means 293 to declutch the shaft 289 from the spindle 247, and whereupon the finger 351 disengages the finger 374. When the finger 351 disengages the finger 374, the sleeve member 357 and the control member 372 resume rotation with the gear 245 and continue so to rotate until the finger 375 on the control member engages the finger 351 on the retracted armature 344, whereupon due to the slipping at the friction couplings 366 and 371, the sleeve and control members are stopped.

The record on the raised and rotating turntable engages the needle 72 and is played. During such playing the grooves in the record cause the reproducer arm 71 to swing about its pivots 66 toward the center of the record, thereby moving the reproducer arm from its natural position of rest and causing its weight acting about the inclined pivot line to tend to move the reproducer arm toward its starting position. That tendency is resisted by the engagement of the needle in the record groove.

When the reproducer arm 71 reaches the end of the record groove, the arm or finger 77 closes the contacts 78. When those contacts are closed, a circuit is completed which includes the conductor 107 connected to the energy supply source 102, the conductor 377, the coil means 343, the conductor 378, the common terminal 379, one of the conductors 81, the contacts 78, the other conductor 81, and the conductor 101 back to the source 102. The magnet 343 is thus reenergized and attracts its armature 344 whereupon the sleeve member 357 and the control member 372 are released by the finger 351 disengaging the finger 375, resume rotation with the gear 245, and are stopped when the finger 376 of the control member engages the finger 351. That operation of the magnet armature also causes the detent 348 to disengage the lug 308 whereby to permit the spring 305 to operate the clutch means 293.

Upon operation of the clutch means 293, as just described, the spindle 247 again drives the shaft 289 to resume driving the shaft 311, whereupon the slot 323 in the disc 322 on the shaft 311 passes beyond the contact carrying members 324 causing the periphery of the disc 322 to close the contacts. The magnet circuit including the contact members 324 as already described will therefore be completed before the reproducer in returning to its starting position causes the finger 77 to release the contacts 78 and thereby permit them to open.

The driving elements R, S, and T, when the rotation of the shaft 311 is resumed, are in the positions shown in Fig. 26. They rotate with the shaft from that position to the position shown in Fig. 27. During such rotation of the driving elements, it will be observed, the Geneva wheel 327 remains stationary by virtue of the fact that it is not drivingly engaged by any of the driving elements and that the convex portion 334 of the mutilated disc 333 is engaging in one of the concave portions 331 of the wheel 327. The driving element T, however, drivingly engages in one of the slots 329 of the Geneva wheel 328 and rotates it through about 90 degrees from the position of Fig. 26 to the position shown in Fig. 27.

That rotation of the Geneva wheel 328 is transmitted to the cam 122 as already described, and causes the cam to operate the linkages 119, 108, and 112, thus lowering the turntable. As the turntable moves downwardly the record thereon disengages the needle 72, thus releasing the arm 75 which gravitates about the inclined axis of the supporting bar 65 toward the starting position of the reproducer. The angular lug 54 and the spring 57 cooperate to stop and to position the arm 71 in its return movement so that the needle 72 will be in starting position for a subsequent record. As already suggested, the finger 77 rotating with the supporting bar 65 during its return movement releases the contacts 78 and permits them to open. The contacts 324, already being closed, however, maintain the circuit through the magnet 343 so that the armature 344 is not released to declutch the shaft 289 from the spindle 247 when the contacts 78 open as just described.

The grooved cam driven from the driving and timing means K thus lowers the turntable bearing the played record to the position shown in Fig. 6. During the lowering of the turntable it passes through the record carrier I from which the record was taken before playing and which has remained in the delivery position during the playing of the record, thus depositing the played record in its record carrier. As the driving element T completes its operation of the Geneva wheel 328, the driving element S approaches one of the slots 329 in the Geneva wheel 327 (see Fig. 27).

Further rotation of the shaft 311 causes the driving elements R, S, and T to rotate from the positions shown in Fig. 27 to those shown in Fig. 28, which is the same as the starting positions shown in Fig. 24. During that rotation none of the driving elements engages the Geneva wheel 328. The driving element S, however, engages in one of the slots 329 of the Geneva wheel 327 and rotates it through about 90 degrees from the position of Fig. 27 to that shown in Fig. 28. That rotation of the Geneva wheel 327 rotates the shaft 332 and the gear 337 thereon sufficiently to rotate the gear 174 and its stub shaft 173 through a half revolution. The rotation of the shaft 173 for that half revolution operates the arm 172, the link 169, and the arm 166 to rotate the shaft 126 in a direction and sufficiently to return the record carrier bearing the played record from its delivery position to its stack position. In that position the key 196 which had keyed the disc 137 of the record carrier to the spacer 148 registers with the slot 139 in the disc wall 138 whereupon the spring 199 returns the key 196 to its original position for releasably latching the record carrier in stack.

After the record carrier I bearing the played record has thus been returned to stack, the disc 322 on the shaft 311 has rotated sufficiently to bring one of its slots 323 into registration with the contact member 324 which thereupon springs open, and the disc 322' on the shaft 311 has rotated sufficiently to bring its slot 323' into registration with the contacts 324' which thereupon spring open. The opening of the contacts 324 opens the energizing circuit of the magnet 343 and thus causes the deenergization of the magnet, whereupon the spring 349 retracts the armature 344 causing the detent 348 to engage the lug 368 and declutch the shaft 289 and hence the shaft 311 from the spindle 247, and causing the finger 351 on the armature 344 to disengage the finger 376 on the control member 372. The sleeve member 357 and the control member 372 are thus free to rotate with the gear 245, when the clutch means 293 is next operated, until the lug 359 on the sleeve member again closes the contacts 352 and until the finger 374 again engages the finger 351 to interrupt the rotation of the sleeve and control members.

The opening of the contacts 324' opens the energizing circuit of the motor 98 and thus causes the motor to stop, bringing the apparatus to rest. The foregoing cycle may be repeated as often as desired by operating the coin or token released means M.

Thus it will be seen that from a single motor, the selection of a record may be effected in accordance with the operation of a selector control; the selected record moved to a delivery position and held therein; the turntable rotated and moved through the delivery position to pick up the selected record and to present it for playing; the turntable held in playing position during the playing of the record; the reproducer conditioned for automatic return after the record is played; the turntable bearing the played record removed through the delivery position of the played record to return it to that position; and the played record removed from its delivery position.

While I have described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A phonograph comprising record reproducing means, a turntable, a record carrier support, and record carrier means arranged in stack relation and having a pair of arms providing pivotal engagement at spaced positions along said support and cooperating with said turntable for moving a record to be played to playing relationship with said record playing means.

2. In a phonograph, record playing means, a plurality of record carriers arranged in stack relation and each having a pair of vertically spaced mounting arms, and a support common to the spaced arms of all of said record carriers and providing a pivotal mounting therefor.

3. A phonograph comprising record reproducing means, a reciprocal turntable, a plurality of superposed record carriers having a common pivot and each supported at a plurality of spaced positions along said pivot, driving means for rotating and reciprocating the turntable and for swinging the record carriers to and from a position in the path of the turntable, means coacting with the record carriers for releasably retaining them in superposed relation, operating means for operating the last said means, means driven from said driving means for driving said operating means, and control means for said operating means for operating the retaining means to selectively release said record carriers.

4. A phonograph comprising record reproducing means, a reciprocable turntable, a plurality of superposed, pivoted record carriers, driving means for rotating the turntable, record selecting means, drive translating means for effecting the selection called for by said record selecting means, swinging the record carrier with the selected record into the path of the turntable, and moving the turntable to playing relationship with said reproducing means, roller-wedging, clutch means between said driving means and said drive translating means, and coin-controlled means for operating said clutch means to clutch said drive translating means to said driving means.

5. In a phonograph, a plurality of record carriers and a support common to said carriers, each of said carriers having a pair of spaced apart arms having aligned mounting portions pivotally mounted on said support with the corresponding mounting portions of the carriers arranged in superposed groups.

6. In a phonograph, a plurality of record carriers having mounting arms, a pivotal support common to said arms and on which said arms are contiguously arranged in a group, and additional arms for said carriers, each having a mounting portion offset from the plane of the first arm of the respective carriers and pivotally mounted on said support in a group adjacent said first group.

7. In a phonograph having a turntable and a plurality of swingable record carriers, means for swinging any of said carriers to a record delivering position with respect to said turntable comprising a slidable keyable member for each of said carriers, a cam carrying member provided with cams each for operating one of said slidable members to keying positions, said cam carrying member being sequentially shiftable axially and rotatable for moving any one of said members selectively into position for actuating the corresponding slidable member to keying position, and mechanism for effecting said sequential operation of said cam carrying member.

8. In a phonograph having a turntable and a plurality of swingable record carriers, a rock shaft upon which said carriers are mounted, a slidable member for each carrier for keying the same to said shaft for movement thereby to and from record delivering position with respect to said turntable, a rotatable shaft provided with a plurality of operating members each for moving one of said slidable members to keying position, and means for so actuating said shaft as to move any one of said operating members into position for actuating the slidable member corresponding to a preselected record carrier, said means comprising manually operable members for shifting said shaft axially and driving mechanism for rotating the shaft while in said shifted position.

9. In a phonograph having a turntable and a plurality of spaced record carriers, a rock shaft upon which said record carriers are arranged in vertically spaced relation, a slidable member for each of said carriers for keying the same to said shaft for movement to and from a record delivering position with respect to said turntable, a rotatable shaft provided with spaced operating members for actuating said slidable members to keying position, means for actuating said shaft to move said operating members to operative position with respect to the corresponding slidable members, and means for shifting said shaft and operating members axially to non-cooperating position with respect to said slidable members and actuating the same arcuately for positioning any one of said operating means exclusively into operative position with respect to the slidable member of a predetermined record carrier.

ALFRED VISCHER, Jr.